(12) United States Patent
Lee et al.

(10) Patent No.: US 8,801,852 B2
(45) Date of Patent: *Aug. 12, 2014

(54) ADDITIVES IN GYPSUM SLURRIES AND ADJUSTING THEIR PROPORTIONS

(71) Applicant: United States Gypsum Company, Chicago, IL (US)

(72) Inventors: Chris C. Lee, Mt. Prospect, IL (US); Alfred C. Li, Naperville, IL (US); Richard J. Haszel, Mundelein, IL (US); David R. Blackburn, Barrington, IL (US); James R. Wittbold, Des Plaines, IL (US); Brent Groza, Grayslake, IL (US)

(73) Assignee: United States Gypsum Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/075,880

(22) Filed: Nov. 8, 2013

(65) Prior Publication Data

US 2014/0073711 A1    Mar. 13, 2014

Related U.S. Application Data

(63) Continuation of application No. 12/870,381, filed on Aug. 27, 2010, now Pat. No. 8,597,426.

(60) Provisional application No. 61/239,259, filed on Sep. 2, 2009.

(51) Int. Cl.
  *C04B 9/04* (2006.01)
  *C04B 11/00* (2006.01)
  *C04B 28/14* (2006.01)
  *B32B 13/00* (2006.01)

(52) U.S. Cl.
  USPC ............ 106/781; 106/772; 106/778; 428/703

(58) Field of Classification Search
  USPC ........................... 106/772, 778, 781; 428/703
  See application file for complete search history.

(56) References Cited

U.S. PATENT DOCUMENTS

| | | | |
|---|---|---|---|
| 3,686,133 | A | 8/1972 | Hattori |
| 4,430,469 | A | 2/1984 | Burge et al. |
| 4,501,839 | A | 2/1985 | Burge et al. |
| 4,725,665 | A | 2/1988 | Pieh et al. |
| 5,158,996 | A | 10/1992 | Valenti |
| 5,643,510 | A | 7/1997 | Sucech |
| 5,750,634 | A | 5/1998 | Albrecht et al. |
| 6,555,683 | B1 | 4/2003 | Weichmann et al. |

(Continued)

FOREIGN PATENT DOCUMENTS

| | | |
|---|---|---|
| DE | 44 11 797 A1 | 10/1995 |
| WO | WO 2006/042709 | 4/2006 |

*Primary Examiner* — Melissa Rioja
(74) *Attorney, Agent, or Firm* — Greer, Burns & Crain, Ltd.; Pradip Sahu; Philip T. Petti

(57) ABSTRACT

A gypsum slurry is provided that includes calcium sulfate hemihydrate; water; a dispersant component comprising at least one of the following a comb-branched polymer with polyether side chains, naphthalene sulfonate-formaldehyde condensate or melamine sulfonate-formaldehyde condensate; a foaming agent; and a polycondensation component with three polycondensation repeating units. Also provided is a method for making a gypsum slurry with a foaming agent in which the ratio between the dispersant component and the polycondensation component is adjusted to control for the size of foam bubbles in the gypsum slurry. Gypsum products made from the gypsum slurry are provided and methods for making the products are provided as well.

14 Claims, 6 Drawing Sheets

(56) References Cited

U.S. PATENT DOCUMENTS

| | | |
|---|---|---|
| 7,767,019 B2 | 8/2010 | Liu |
| 2006/0278128 A1 | 12/2006 | Liu et al. |
| 2008/0000392 A1 | 1/2008 | Blackburn et al. |
| 2008/0108732 A1 | 5/2008 | Wieland et al. |
| 2008/0148997 A1 | 6/2008 | Blackburn et al. |
| 2009/0292045 A1 | 11/2009 | Lettkeman et al. |

ADDITIVES IN GYPSUM SLURRIES AND ADJUSTING THEIR PROPORTIONS

CROSS REFERENCE TO RELATED APPLICATIONS

This application is a continuation application of U.S. patent application Ser. No. 12/870,381, filed Aug. 27, 2010, which claims priority under 35 USC 119(e) from U.S. Ser. No. 61/239,259 filed Sep. 2, 2009 and entitled, "Additives in Gypsum Panels and Adjusting Their Proportions," herein incorporated by reference. This application is related to U.S. Ser. No. 12/552,338, filed Sep. 2, 2009 and entitled "Formulation and Its Use," herein incorporated by reference.

BACKGROUND OF THE INVENTION

This invention relates to gypsum products. More specifically, it relates to a gypsum-based panel that requires less time or less energy for drying than conventional products.

Gypsum-based panels are commonly used in construction. Wallboard made of gypsum is fire retardant and can be used in the construction of walls of almost any shape. It is used primarily as an interior wall or exterior wall or ceiling product. Gypsum has sound-deadening properties. It is relatively easily patched or replaced if it becomes damaged. There are a variety of decorative finishes that can be applied to the wallboard, including paint and wallpaper. Even with all of these advantages, it is still a relatively inexpensive building material.

One reason for the low cost of wallboard panels is that they are manufactured by a process that is fast and efficient. Calcium sulfate hemihydrate hydrates in the presence of water to form a matrix of interlocking calcium sulfate dihydrate crystals, causing it to set and to become firm. A slurry that includes the calcium sulfate hemihydrate and water is prepared in a mixer. When a homogeneous mixture is obtained, the slurry is continuously deposited on a moving surface that optionally includes a facing material. A second facing material is optionally applied thereover before the slurry is smoothed to a constant thickness and shaped into a continuous ribbon. The continuous ribbon thus formed is conveyed on a belt until the calcined gypsum is set, and the ribbon is thereafter cut to form panels of desired length, which panels are conveyed through a drying kiln to remove excess moisture. Since each of these steps takes only minutes, small changes in any of the process steps can lead to gross inefficiencies in the manufacturing process.

The amount of water added to form the slurry is in excess of that needed to complete the hydration reaction. Excess water gives the slurry sufficient fluidity to flow out of the mixer and onto the facing material to be shaped to an appropriate width and thickness. As the product starts to set, the water pools in the interstices between dihydrate crystals. The hydration reaction continues building the crystal matrix in and around the pools of water, using some of the pooled water to continue the reaction. When the hydration reactions are complete, the unused water occupying the pools leaves the matrix by evaporation. Interstitial voids are left in the gypsum matrix when all water has evaporated. The interstitial voids are larger and more numerous where large amounts of excess water are used.

While the product is wet, it is very heavy to move and relatively fragile. The excess water is removed from the board by evaporation. If the excess water were allowed to evaporate at room temperature, it would take a great deal of space to stack and store wallboard while it was allowed to air dry over a relatively lengthy time period or to have a conveyor long enough to provide adequate drying time. Until the board is set and relatively dry, it is somewhat fragile, so it must be protected from being crushed or damaged.

To hasten evaporation, the wallboard panel is usually dried by evaporating the excess water at elevated temperatures, for example, in an oven or kiln. It is relatively expensive to operate the kiln at elevated temperatures, particularly when the cost of fossil fuels rises. A reduction in production costs could be realized by reducing the amount of excess water present in set gypsum boards that is later removed by evaporation.

Dispersants are known for use with gypsum that help fluidize the mixture of water and calcium sulfate hemihydrate so that less water is needed to make a flowable slurry.

β-Naphthalene sulfonate formaldehyde ("BNS") and melamine sulfonate formaldehyde ("MFS") condensate dispersants are well known, but have limited efficacy. The preparation and use of BNS is well known state of the art and disclosed in EP 0 214 412 A1 and DE-PS 2 007 603, herein incorporated by reference. The effect and properties of BNS can be modified by changing the molar ratio between formaldehyde and the naphthalene component that usually is from about 0.7 up to about 3.5. The ratio between formaldehyde and the sulfonated naphthalene component preferably is from about 0.8 to 3.5 to about 1. BNS condensates are added to the hydraulic binder containing composition in amounts from about 0.01 up to about 6.0 wt. %.

Melamine-sulfonate-formaldehyde-condensates are broadly used as flow improving agents in the processing of hydraulic binder containing compositions such as dry mortar mixtures, pourable mortars and other cement bonded construction materials and in the production of gypsum panels. Melamine is used in this connection as representative of s-triazine. They cause a strong liquefying effect of the construction chemicals mixture while minimizing undesired side effects occurring in the processing or in the functional properties of the hardened building material. As it is for the BNS technology, there is also broad prior art for MFS. MFS dispersants are revealed in DE 196 09 614 A1, DE 44 11 797 A1, EP 0 059 353 A1 and DE 195 38 821A1.

DE 196 09 614 A1 discloses a water soluble polycondensation product based on an amino-s-triazine and its use as plasticizer in aqueous binder containing suspensions based on cement, lime and gypsum. These polycondensates are capable in two condensation steps whereby in a pre-condensation step the amino-s-triazine, the formaldehyde component and the sulfite are condensed at a molar ratio of 1 to 0.5:5.0 to 0.1:1.5. Melamine is a preferred representative of amino-s-triazines. Further suitable representatives are amino plast former selected from the group urea, thiourea, dicyandiamide or guanidine and guanidine salts.

According to DE 44 11 797 A1 sulfanilic acid-containing condensation products based on amino-s-triazines that show at least two amino groups are prepared by using formaldehyde. The sulfanilic acid is used in amounts of from 1.0 to 1.6 mol per mol amino-s-triazine and neutralized in aqueous solution with an alkaline metal hydroxide or in earth alkaline metal hydroxide. In an additional step the formaldehyde is added in amounts of from 3.0 to 4.0 mol per mol amino-s-triazine at a pH value between 5.0 to 7.0 and at temperatures between 50 and 90° C. The final viscosity of the solution is between 10 and 60 cSt at 80° C.

According to EP 0 059 353 A1 highly concentrated and low viscosity aqueous solutions of melamine/aldehyde resins are capable by reacting melamine and an aldehyde in an alkaline medium in a first step with a component selected from the group comprising alkali sulphate, earth alkali sulphate or (earth) alkali sulfonate or other suitable amino compounds to a pre-condensate. This mixture in an additional process step is reacted with another amino compound such as amino acids or amino carbonic acids and finally the resin solution is brought to an alkaline pH value.

DE 195 38 821A1 discloses a condensate based on an amino-s-triazine with at least two amino groups and formaldehyde, and a high content of sulfonic acid groups and a low content of formate. Such products can be prepared according to this document by reacting the amino-s-triazine, formaldehyde and a sulfite at a molar ratio of 1:3.0:6.0:1.51:2.0 in an aqueous solution and at a temperature between 60 and 90° C. and a pH value between 9.0 and 13.0 until the sulfite is no longer present. In an additional step the condensation process is conducted at a pH value between 3.0 and 6.5 and at temperatures between 60 and 80° C. until the condensation product at 80° C. shows a viscosity between 5 and 50 mm$^2$/s. Finally, the condensation product is to be brought to a pH value between 7.5 and 12.0 or treated thermally by a pH≥10.0 and a temperature between 60 and 100° C.

Polycarboxylate dispersants are commonly used with cements and, to a lesser degree, with gypsum. The class of compounds represented by the term "polycarboxylate dispersants" is large, and it is very difficult to predict how individual compounds react in different media. The use of a two-monomer polycarboxylate dispersant in gypsum products is disclosed in U.S. Pat. No. 7,767,019, herein incorporated by reference.

As has been previously disclosed, many polycarboxylate dispersants have deleterious effects on gypsum-based products. These dispersants retard setting of the calcined gypsum. The degree of retardation depends on the exact formulation of the polycarboxylate dispersant. Some polycarboxylate dispersants also cause a loss in compressive strength of foamed gypsum casts due to stabilization of foam. This leads to formation of smaller voids within the set gypsum. It is difficult to predict how severely a polycarboxylate dispersant will react in a gypsum slurry merely from the chemical formula.

A relatively new class of dispersants has become known for use in cements. It is a phosphated polycondensate dispersant. Although this dispersant is very effective for use in cement, it has lower efficacy in gypsum slurries compared to polycarboxylate dispersants, but it is also low in set retardation.

WO 2006/042709 describes polycondensates based on an aromatic or heteroaromatic compound (A) having 5 to 10 C atoms or heteroatoms, having at least one oxyethylene or oxypropylene radical, and an aldehyde (C) selected from the group consisting of formaldehyde, glyoxylic acid and benzaldehyde or mixtures thereof, which result in an improved plasticizing effect of inorganic binder suspensions compared with the conventionally used polycondensates and maintain this effect over a longer period ("slump retention"). In a particular embodiment, these may also be phosphated polycondensates. The phosphated monomers used are, however, relatively expensive since they have to be separately prepared and purified.

Alternatively, there has been developed an economical dispersant, based on a phosphated polycondensate, for hydraulic binders, which dispersant is particularly suitable as a plasticizer/water-reducing agent for concrete and can be prepared in a simple manner and at low cost. It is described in provisional application EP 081659155.3, filed in August 2008.

Those who install gypsum panels become fatigued by continuously moving and lifting the panels. It is, therefore advantageous to make panels that are lightweight for ease in handling. Lightweight panels can be made by adding foam to the gypsum slurry. A foaming agent, such as soap, can be added to the slurry so that foam is produced by the mixing action. In some cases, the foaming agent is used to pregenerate a foam that is added to the slurry after it exits the mixer. The foaming agent is selected to produce a foam that is actively coalescing while hydration is taking place. A distribution of foam bubble sizes results from an "active" foam. As the hydration reactions proceed, the gypsum matrix builds up around the foam bubbles, leaving foam voids in the matrix when the set gypsum forms and the foam bubbles break.

It can be difficult to obtain a distribution of foam voids that results in an acceptable panel strength. Foam voids that are very small and numerous have very thin walls of gypsum matrix between them. Poor compressive strength of the finished panel may result. Formation of very large foam voids can produce unevenness in the surface of the panel, making it aesthetically unacceptable. It has been found that when the set gypsum has a distribution of large and small foam voids, the panel can have both strength and an aesthetically pleasing appearance. This foam void distribution can be achieved by using a combination of soaps that form stable foam and soaps that form unstable foam.

It is clear that design of a gypsum panel includes many variables that are interrelated. Dispersants used to reduce water also change the set time of the gypsum slurry. Some dispersants stabilize foam bubbles, while other dispersants destabilize the foam. Set accelerators that decrease the initial hydration time also reduce initial fluidity of the slurry. In addition to changing bubble size distribution, soaps affect slurry fluidity. The additives used to control the slurry fluidity, hydration time and foam bubble size distribution each affect multiple variables, making it difficult to strike a balance among all of these factors.

SUMMARY OF THE INVENTION

One or more of these and other problems are solved by each of the embodiments of the panel provided by the invention that includes a matrix of calcium sulfate dihydrate crystals and two different types of dispersants. One dispersant is a dispersant component (hereafter "dispersant component") and another dispersant is a polycondensation component (hereafter referred to as the "polycondensation component"). The dispersant component has dispersing properties and is a comb-branched polymer with polyether side chains, naphthalene sulfonate-formaldehyde condensate, melamine sulfonate-formaldehyde condensate or mixture of two or more thereof. The polycondensation component includes three repeating units. A first polycondensation repeating unit has a polyether side chain and either an aromatic sub-unit or a heteroaromatic sub-unit. A second polycondensation repeating unit has a OP(OH)$_2$ group and either an aromatic sub-unit or a heteroaromatic sub-unit. A third polycondensation repeating unit has an aromatic sub-unit or a heteroaromatic sub-unit. The second polycondensation repeating unit and the third polycondensation repeating unit differ exclusively in that the OP(OH)$_2$ ("phosphate") groups of the second polycondensation repeating unit are replaced by H in the third polycondensation repeating unit, and the third polycondensation repeating unit is not the same as the first polycondensation repeating unit.

A method of making the gypsum panel includes combining stucco, water and a first dosage of a first dispersant to form a slurry. A second dosage of a second dispersant is added to the slurry. Properties of the gypsum slurry are tested and it is formed into a product. The product sets and properties of the product are identified. The first dosage or the second dosage is changed based on the properties of the slurry or product.

Using both types of dispersants brings to a panel product the advantages of both. The dispersant component has greater efficacy for water reduction than the polycondensation component, while the polycondensation component minimizes the set retardation of the gypsum slurry. Simultaneous use of both dispersant types allows these properties to be balanced over a wide range of variables, including the source and quality of raw materials, stucco crystal form, the number and amounts of other additives used. Manufacturing plants using different raw materials are able to utilize a different ratio of the dispersant component to the polycondensation component. Use of the two dispersants also allows for production of a cost effective product depending on the costs of fuel and raw materials, and/or increased production rate.

In slurries additionally including foam to produce foam voids in the panel products, surprisingly, it has also been found that the choice of some of the dispersant components allows for better control of the foam void structure in gypsum panel products. Some of the dispersant components have minimal effect on the size and distribution of the foam voids left behind by the foam added to the gypsum slurry, while other dispersant components produce a noticeable effect. This effect is caused by the additives' effects upon the stability of the foam. The ability to choose the dispersant types and proportions to achieve a desired degree of foam stability would provide another means of engineering an appropriate foam void structure to provide desired balance of strength and density to the gypsum panel product.

Optionally, the panel also includes a defoaming component to have a further effect on achieving the desired balance. The defoaming component is present either as a free compound in solution or as a moiety on the dispersant component or the polycondensation component.

The method of adjusting the relative amounts of two dispersants relative to each other adds another degree of freedom in the process control. Properties such as the slurry fluidity, the hydration time and the foam bubble size are affected by a number of additives. Balancing amounts of set accelerator, dispersant, foaming agent, antifoaming agent and the like makes it difficult to achieve the desired properties. Selection of dispersants that promote different effects in the properties provides a way of achieving the desired hydration time, bubble size distribution and fluidity.

DETAILED DESCRIPTION OF THE INVENTION

Gypsum panels are made from a slurry on high-speed manufacturing equipment. Efficient manufacturing of gypsum slurries or panels requires control over the product properties. A gypsum panel including additives and a method for adjusting these additives provides improved control over the manufacturing process and an improved product.

As used herein, "efficacy" is a measure of a dispersant's ability to improve the fluidity of a gypsum slurry at constant dispersant dosage. If improved fluidity is not needed, improvements in efficacy can be used to reduce the amount of water used to fluidize the slurry while holding the fluidity, or "slump," constant. A decision as to which of these choices to select is based on a number of things including the product to be made, the raw materials, process configurations and economics.

"Hydration time" is a measure of the rate of the hydration reactions. In some manufacturing facilities, it is important to achieve a sufficient degree of hydration, or "set", in the time it takes the gypsum to arrive at the knife, such that the panels have enough stiffness to maintain their structural integrity. The knife cuts the gypsum ribbon into individual panels.

Figure 1:
FIG. 1 is a photograph of the interior of a sample having void Structure A.
Figure 2:
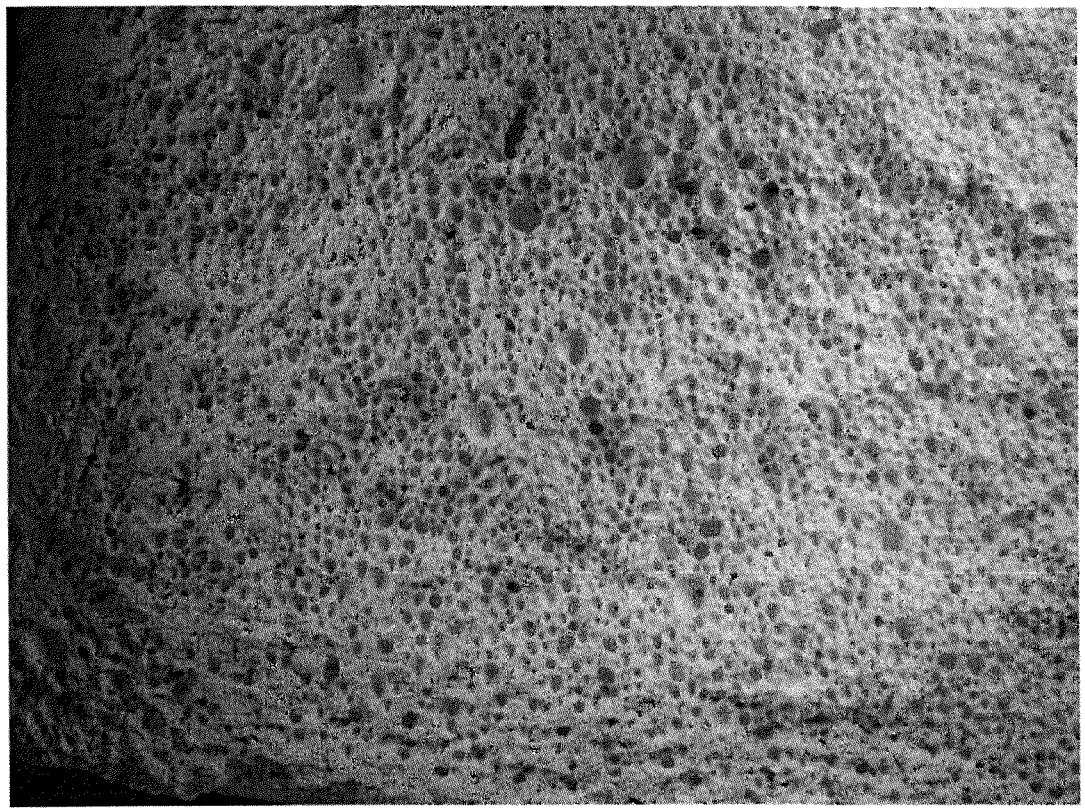
FIG. 2 is a photograph of the interior of a sample having void Structure B.
Figure 3:
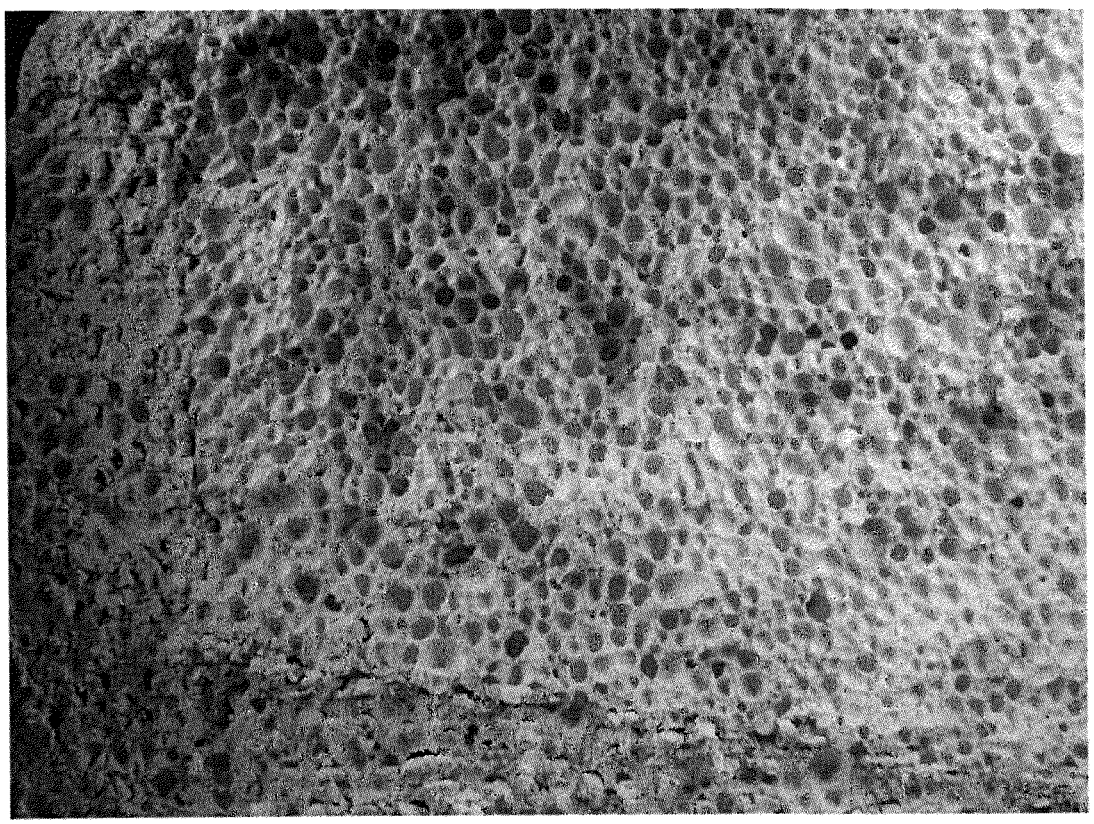
FIG. 3 is a photograph of the interior of a sample having void Structure C.

"Gypsum bubble structure" refers to the sizes of individual bubbles in the slurry after the foam has been added. It should be understood that the foam bubbles in the slurry form the foam voids in the set gypsum panel when the calcium sulfate dihydrate crystals form around the foam bubble. Thus, the sizes of the foam voids are determined by the sizes of the bubbles from which they are made. Various types of structures are often utilized in panels, each of which can be desirable in different products. FIGS. 1, 2 and 3 illustrate some of these various structures, denoted Structure A, Structure B and Structure C, respectively. These structures vary in their foam void size, proceeding in size going from Structure A to Structure B to Structure C.

A gypsum building panel is made using stucco and water to form a calcium sulfate dihydrate crystal matrix. Stucco is an inorganic binder material also known as calcined gypsum, calcium sulfate hemihydrate, calcium sulfate anhydrite or plaster of Paris. Synthetic gypsums, such as that formed as a by-product of flue gas desulfurization, are also useful. Any of the several forms of stucco are useful in the building panel of the present invention, including alpha or beta-calcined gypsum or mixtures thereof. A needle-shaped crystal of beta-stucco is formed by calcination at atmospheric pressure. Alpha-calcined stucco is produced when gypsum is calcined under pressure and is characterized by less acyclical crystals. Beta-calcined stucco requires more water than alpha-calcined stucco to make a slurry of equivalent flowability. Upon the addition of water, all forms of the stucco hydrate to form an interlocking matrix of calcium sulfate dihydrate crystals.

Addition of other inorganic binder components together with the stucco is contemplated for use with the present panel, including, but not limited to cement, pozzolans, gypsum and combinations thereof. In some embodiments the calcined gypsum is present in the slurry in amounts of more than 50% by weight of the total inorganic binder components.

Water is added to the stucco in sufficient amounts to make a flowable slurry. The water to stucco ratio ("WSR") is the weight of water per hundred weight dry stucco. A WSR of about 20 is the minimum amount of water needed to fully hydrate calcium sulfate hemihydrate. Some embodiments of the invention utilize a WSR from about 20 to about 100. Other embodiments have a WSR from about 40 to about 70. The amount of water required will depend on the type of calcined gypsum, the type of additives used, the stucco source and the quantity of the additives that are utilized.

In addition to the stucco and water, the slurry utilized for some embodiments is made using two dispersants. Preferably the two dispersants include any dispersant and a polycondensation component. In some aspects of the invention, the dispersant is a dispersant component further described below. The slurry optionally includes additional components such as surfactants and antifoaming agents.

The dispersant component has one or more dispersant properties. Any dispersing properties known in the art are suitable. Examples of dispersing properties include, but are not limited to increased flowability, slurry uniformity and reduction in water addition. The dispersant component is selected from a group that includes comb-branched polymers having polyether side chains, naphthalene sulfonate-formaldehyde condensates, melamine sulfonate-formaldehyde condensates and mixtures thereof. Preferably, from 0.05 to 1.0 wt. %, preferably from 0.1 to 0.5 wt. % and especially preferably from 0.15 to 0.3 wt. % of the additive blend is the dispersant component, each based on the total additive blend.

Formulations which contain a comb-branched polymer having polyether side chains as the dispersant component have been found to be effective. Examples of the dispersant component include a polycarboxylate ether, a polycarboxylate ester, an uncharged copolymer or a mixture thereof.

Polycarboxylate ether copolymers which are suitable as the dispersant component have been previously described in WO 2006/133933 A2, herein incorporated by reference. These copolymers consist of two repeating units. The first polycarboxylate repeating unit is derived from an olefinically unsaturated monocarboxylic acid comonomer, an ester or a salt thereof and/or an olefinically unsaturated sulfonic acid comonomer or a salt thereof.

The second polycarboxylate repeating unit is of the general formula (I)

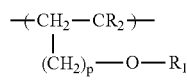

wherein $R_1$ represents

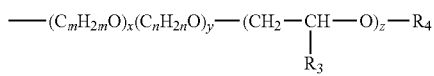

and $R_2$ represents H or an aliphatic hydrocarbon residue with 1 to 5 C atoms; $R_3$=unsubstituted or substituted aryl residue and preferably phenyl, and $R_4$=H or an aliphatic hydrocarbon residue with 1 to 20 C atoms, cycloaliphatic hydrocarbon residue with 5 to 8 C atoms, a substituted aryl residue with 6 to 14 C atoms or a member of the series:

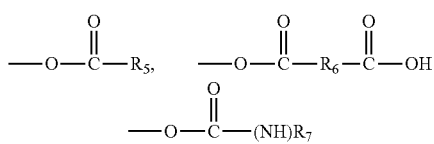

wherein $R_5$ and $R_7$ each represent an alkyl, aryl, aralkyl, or alkaryl residue and $R_6$ for an alkylidene, arylidene, aralkylidene or alkarylidene residue, and p=0, 1, 2, 3 or 4 m, n mutually independently mean 2, 3, 4 or 5 x and y mutually independently denote an integer≤350 and z 0 to 200.

In some embodiments, there are no internal molecular differences between the first polycarboxylate repeating unit and the second polycarboxylate repeating unit in polycarboxylate ether copolymer. Other embodiments of the copolymer utilize a polymeric mixture of the first polycarboxylate repeating unit and the second polycarboxylate repeating unit, in which case there are optionally internal molecular differences with respect to the radicals $R^1$, $R^2$, $R^3$, $R^4$, $R^5$, $R^6$, $R^7$, m, n, x, y and/or z. The differences often relate to the composition and length of the side chains.

The polycarboxylate ether copolymer includes the first polycarboxylate repeating unit in amounts of about 30 to about 99 mol. % and the second polycarboxylate repeating unit in amounts of about 70 to about 1 mol. %. Embodiments where the polycarboxylate ether copolymer includes the first polycarboxylate repeating unit in proportions of about 40 to about 90 mol. % and the second polycarboxylate repeating unit in amounts of about 60 to about 10 mol. % has been found particularly advantageous.

The first polycarboxylate repeating unit is preferably derived from an acrylic acid or a salt thereof and the second polycarboxylate repeating unit is derived from a monomer component that is preferably a vinyl or allyl group having as the residue $R^1$ a polyether and where p=0 or 1. Further, in some embodiments the first polycarboxylate repeating units derive from acrylic acid, methacrylic acid, crotonic acid, isocrotonic acid, allylsulfonic acid, vinylsulfonic acid and suitable salts thereof and alkyl or hydroxyalkyl esters thereof.

In addition, the polycarboxylate ether copolymer optionally has additional structural groups in copolymerized form. In this case, the additional structural groups that include styrenes, acrylamides, hydrophobic compounds, ester repeating unit, polypropylene oxide and polypropylene oxide/polyethylene oxide units are preferred. The polycarboxylate ether copolymer includes the additional repeating units in amounts up to 5 mol. %, preferably from 0.05 to 3.0 mol. % and more preferably from 0.1 to 1.0 mol. %.

Any comb-branched polycarboxylate dispersant is useful in the slurry. Examples of useful polycarboxylate dispersants include, but are not limited to dispersants from the MELFLUX® Dispersant series by BASF Construction Polymers, GmbH (Tröstberg, Germany), ETHACRYL® M Dispersant by CoAtex, LLC (Chester, S.C.) and MIGHTY EG® Dispersant by Kao Specialties Americas, LLC, (High Point, N.C.). The use of combinations of dispersants is also contemplated. All of these polymers have polyether side chains.

Suitable polycarboxylate esters are included in EP 0 753 488 B1, herein incorporated by reference. The polycarboxylate ester in some embodiments is prepared by polymerization of a monomer mixture containing a carboxylic acid monomer as the main component. In other embodiments, it is advantageous if the formula (I) represents a polyether containing alkyl or vinyl groups. An aspect of many polycarboxylate esters is their anti-foaming, defoaming and/or surface active properties. Therefore in some embodiments where the dispersant component is such a polycarboxylate ester, the dispersant component can provide antifoaming and surfactant effects in addition to their dispersing effect. In some embodiments, the monomer mixture includes an (alkoxy) polyalkylene glycol mono(meth)acrylate monomer of the general formula (II):

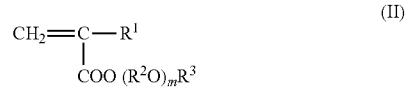

in which $R^1$ represents a hydrogen atom or a $CH_3$ group, $R^2O$ represents one representative or a mixture of at least two oxyalkylene groups having 2 to 4 carbon atoms, $R^3$ represents a hydrogen atom or an alkyl group having 1 to 5 carbon atoms and m represents a number between 1 and 250 and represents the average number of moles of the oxyalkylene group added, A second monomer is a (meth)acrylic acid of the general formula (III),

in which $R^4$ represents a hydrogen atom or a $CH_3$ group and $M^1$ represents a hydrogen atom, a monovalent metal atom, a divalent metal atom, an ammonium group or an organic amine group.

An additional monomer is optionally copolymerized with the carboxylic acid monomers and the (meth)acrylic acid monomers. The carboxylic acid monomers are preferably present in an amount of from about 5 to about 98 wt. %, the (meth)acrylic acid monomers in an amount of from about 2 to about 95 wt. % and the optional monomer in an amount of up to about 50 wt. % in the monomer mixture (I).

Typical representatives of the polycarboxylate monomer include hydroxyethyl(meth)acrylate, hydroxypropyl(meth)acrylate, polyethylene glycol mono(meth)acrylate, polypropylene glycol mono(meth)acrylate, polybutylene glycol mono(meth)acrylate, polyethylene glycol polypropylene glycol mono(meth)acrylate, polyethylene glycol polybutylene glycol mono(meth)acrylate, polypropylene glycol polybutylene glycol mono(meth)acrylate, polyethylene glycol polypropylene glycol polybutylene glycol mono(meth)acrylate, methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, ethoxypolyethylene glycol polypropylene glycol polybutylene glycol mono(meth)acrylate or mixtures thereof.

For the (meth)acrylic acid monomer, acrylic acid, methacrylic acid, monovalent metal salts, divalent metal salts, ammonium salts and organic amine salts thereof and mixtures thereof are to be regarded as preferred.

As regards the additional optional monomer, it has an ester of an aliphatic alcohol with 1 to 20 carbon atoms and an unsaturated carboxylic acid. The unsaturated carboxylic acid is preferably maleic acid, fumaric acid, citraconic acid (meth)acrylic acid or monovalent metal salts, divalent metal salts, ammonium salts or organic amine salts thereof.

The polycarboxylate ester of the comb-branched polymer can be a copolymer which is made from at least one of the following monomers:

A) a first ethylenically unsaturated monomer containing a hydrolyzable residue;
B) a second ethylenically unsaturated monomer with at least one $C_2$-$C_4$ oxyalkylene side group with a chain length from 1 to 30 units; or
C) a third ethylenically unsaturated monomer with at least one $C_2$-$C_4$ oxyalkylene side group with a chain length from 31 to 350 units.

In a preferred embodiment of the present invention the second and third ethylenically unsaturated monomers are both present in the polycarboxylate ester.

The first ethylenically unsaturated monomer is at least one anhydride or imide and/or at least one maleic anhydride or maleimide. The first ethylenically unsaturated monomer also optionally includes an acrylate ester with an ester functionality which contains the hydrolyzable residue. In this case, it should be regarded as preferred if the ester functionality is at least one hydroxypropyl or hydroxyethyl radical.

In a further embodiment the polycarboxylate ester can further include more than one ethylenically unsaturated monomer with a hydrolyzable radical. Preferably the first ethylenically unsaturated monomer has more than one of the first ethylenically unsaturated monomers, at least one representative of a hydrolyzable radical or a mixture of both. In this case, the hydrolyzable radical should have at least one $C_2$-$C_{20}$ alcohol functionality. The present invention also includes the possibility that the hydrolyzable residue is at least one $C_1$-$C_{20}$ alkyl ester, one $C_1$-$C_{20}$ aminoalkyl ester, one $C_2$-$C_{20}$ alcohol, one $C_2$-$C_{20}$ amino alcohol or one amide.

At least one of the second or third ethylenically unsaturated monomer has a $C_2$-$C_8$ alkyl ether group. In this case, the ethylenically unsaturated monomer can have a vinyl, allyl or (methyl)allyl ether residue or else be derived from an unsaturated $C_2$-$C_8$ alcohol. In the latter case of the unsaturated $C_2$-$C_8$ alcohol, at least vinyl alcohol, (meth)allyl alcohol, isoprenol or methylbutanol are especially preferred possibilities as representatives. The ethylenically unsaturated monomer side groups of the second or third ethylenically unsaturated monomer can however also contain at least one $C_4$ oxyalkylene unit.

In connection with the modifications just described, concerning the polycarboxylate ester comb-branched polymer, it can be stated that at least one of the second and third ethylenically unsaturated monomers optionally has a $C_2$-$C_8$ carboxylate ester which in particular is hydrolyzable. Further, the oxyalkyl side groups have at least one ethylene oxide, one propylene oxide, one polyethylene oxide, one polypropylene oxide or mixtures thereof.

Finally, the polycarboxylate ester copolymer optionally includes at least one nonionic ("uncharged") monomer, one non-hydrolyzable monomer residue or mixtures thereof.

In addition to the polycarboxylate ethers and polycarboxylate esters, the present invention also includes a fourth polycarboxylate repeating unit of the comb-branched polymer which is a nonionic copolymer. Units of the general formula (IV) are preferred for forming the nonionic copolymer:

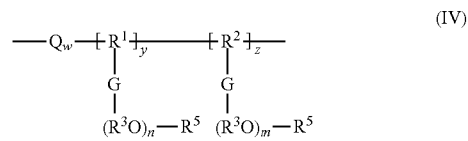

wherein Q stands for an ethylenically unsaturated monomer with at least one hydrolyzable residue, G means O, C(O)—O or O—$(CH_2)_p$—O with p=2 to 8, wherein mixtures of the modifications of G in one polymer are possible; $R^1$ and $R^2$, independently, are at least one $C_2$-$C_8$ alkyl; $R^3$ comprises $(CH_2)_c$, where c is a whole number between 2 and 5 and where mixtures of the representatives of $R^3$ in the same polymer molecule are possible; $R^5$ means at least one representative selected from the series H, a linear or branched, saturated or unsaturated $C_1$-$C_{20}$ aliphatic hydrocarbon residue, a $C_5$-$C_8$ cycloaliphatic hydrocarbon residue or a substituted or unsubstituted $C_6$-$C_{14}$ aryl residue; m=1 to 30, n=31 to 350, w=1 to 40, y=0 to 1 and z=0 to 1, where the sum (y+z)>0, The nonionic copolymer alternatively includes units of the general Formula (V):

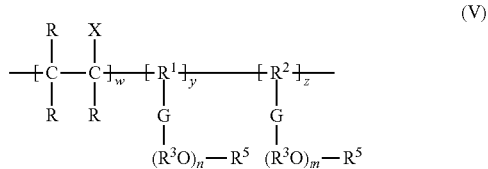

wherein X stands for a hydrolyzable residue and R for H or $CH_3$, and G, p, $R^1$, $R^2$, $R^3$, $R^5$, m, n, w, y, z and (y+z) have the meanings stated under the formula (IV).

In the case where the structure of the nonionic copolymer corresponds to Formula (V), in a preferred embodiment the hydrolyzable residue is at least one representative of the series alkyl ester, aminoalkyl ester, hydroxyalkyl ester, aminohydroxyalkyl ester or amide.

The nonionic copolymer can also be of the general formula (VI):

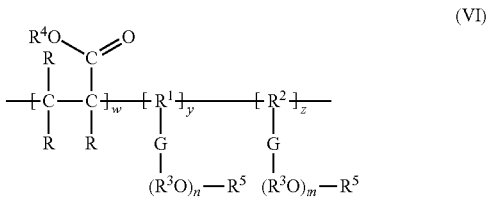

wherein $R^4$ is at least one $C_1$-$C_{20}$ alkyl or a $C_2$-$C_{20}$ hydroxyalkyl radical, and the variables G, p, R, $R^1$, $R^2$, $R^3$, c, $R^4$, $R^5$, m, n, w, y, z and (y+z) have the meanings as defined for the nonionic copolymer above.

It is preferable that in Formula (VI), p=4, $R^4$=$C_2H_4OH$ or $C_3H_6OH$, each of the radicals $R^5$ represents H, m=5-30, n=31-250, w=1.5-30, y=0 to 1, z=0 to 1 and (y+z)>0. In another preferred embodiment, in Formulae (IV), (V) and (VI), the molar ratio of w to the sum (y+z) is 1:1 to 20:1 and preferably 2:1 to 12:1. Another preferred embodiment of Formula (VI) is a nonionic polyether-polyester copolymer.

The dispersant component acts to increase the hydration time, with some polycarboxylates causing severe set retardation. Most polycarboxylate dispersants stabilize foam. An exception to this is a polycarboxylate dispersant that includes an antifoaming component together with the dispersant.

Regardless of the specific dispersants or moieties that are selected, the dispersant component is optionally present in an additive blend in amounts of about 5% to about 95% by weight. In some embodiments the dispersant component is about 10% to about 60% or from about 15% to about 40% by weight of the additive blend.

Sulfonated condensates are also useful as the dispersant component. Sulfonic acid group containing s-triazines or naphthalene-formaldehyde condensates are broadly disclosed by prior art documents and frequently used as water reducing agents or plasticizers for cement based systems such as concrete.

β-naphthalene-sulfonate-formaldehyde condensates ("BNS"), also known as naphthalene-formaldehyde sulfonates, disperse particles by an electrostatic repulsion that results from adsorption processes. The molar ratio of formaldehyde to naphthalene sulfonic acid is from about 1.3 to 1 to about 3 to 1.

It is well known that commercially available flow improving agents based on melamine-formaldehyde-sulfonates, such as products of the MELMENT® series of dispersants from BASF Construction Polymers GmbH, Tröstberg, Germany, cause an excellent liquefying effect even of low dosages of about 0.3 to 1.2 wt. %, relative to the weight of an inorganic binder.

The BNS or MFS dispersant is used in amounts of from 0.01 to 10 wt. % and preferably 0.1 to 5 wt. %, related to the hydraulic binder component. The molar ratio of the sulfonic group and related to the melamine component is of from 1.0 to 2.0 and the molar ratio of the formaldehyde related to the melamine component is from 2.5 to 5.0. Preferably the molar ratio melamine to sulfonic acid to formaldehyde is 1:1.1:1.5: 3.3:3.6. Both BNS and MFS dispersants destabilize foam and increase fluidity in addition to increasing foam bubble structure.

The polycondensation component is also present in some embodiments. The polycondensation component is a copolymer having at least three polycondensate repeating units. A first polycondensate repeating unit has an aromatic or heteroaromatic sub-unit and a polyether side chain. A second polycondensate repeating unit includes at least one phosphated polycondensate repeating unit having an aromatic or heteroaromatic sub-unit. A third polycondensate repeating unit has an aromatic or heteroaromatic sub-unit. The second polycondensate repeating unit and the third polycondensate repeating unit differ exclusively in that the OP(OH)$_2$ group of the second polycondensate repeating unit is replaced by H in the third structural unit, and the third polycondensate repeating unit is not the same as the first polycondensate repeating unit.

The first polycondensate repeating unit of the polycondensation component is described by Formula (VII):

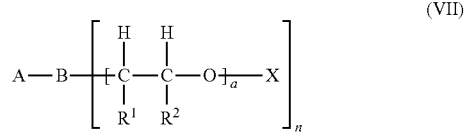

wherein A units are identical or different and are represented by a substituted or unsubstituted aromatic or heteroaromatic compound having 5 to 10 C atoms;

where B units are identical or different and are represented by N, NH or O;

where n=2, if B=N and n=1, if B=NH or O;

wherein $R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H;

wherein "a" values are identical or different and are represented by an integer from 1 to 300;

wherein X units are identical or different and are represented by a branched or straight-chain $C_1$- to $C_{10}$-alkyl radical, $C_5$- to $C_8$-cycloalkyl radical, aryl radical, heteroaryl radical or H.

The second polycondensate repeating unit is described by Formula (VIII):

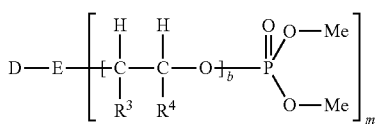

and the third polycondensate repeating unit is described by Formula (IX):

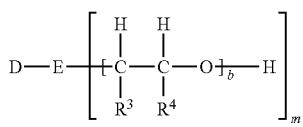

For Formulas (VIII) and (IX) in each case:
D units are identical or different and are represented by a substituted or unsubstituted heteroaromatic compound having 5 to 10 C atoms;
E units are identical or different and are represented by N, NH or O;
m=2 if E=N and m=1 if E=NH or O;
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H;
"b" values are identical or different and are represented by an integer from 0 to 300;
M groups, independently of one another, are an alkaline metal ion, alkaline earth metal ion, ammonium ion, organic ammonium ion and/or H; and
c is 1 or in the case of alkaline earth metal ions ½.

In a preferred embodiment, the polycondensation component contains a fourth polycondensate repeating unit of Formula (X):

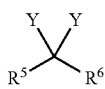

wherein Y groups, independently of one another, are identical or different and are represented by Formulae (VII), (VIII), (IX) or further constituents of the polycondensate;
wherein $R^5$ groups are identical or different and are represented by H, $CH_3$, $COOM_C$ or a substituted or unsubstituted aromatic or heteroaromatic compound having 5 to 10 C atoms; and
wherein $R^6$ groups are identical or different and are represented by H, $CH_3$, $COOM_C$ or a substituted or unsubstituted aromatic or heteroaromatic compound having 5 to 10 C atoms.

Preferably, $R^5$ and $R^6$ in Formula (X), independently of one another, are represented by H, $COOM_C$ and/or methyl.

The molar ratio of the units of Formulae (VII), (VIII), (IX) and (X) of the polycondensation component varies within wide ranges. In some embodiments wherein the molar ratio of the first, second, third and fourth polycondensate repeating units are represented by their formula number, then [(VII)+(VIII)+(IX)]:(X) is 1:0.8 to 3, preferably 1:0.9 to 2 and particularly preferably 1:0.95 to 1.2. The molar ratio of the first, second and third polycondensate repeating units (VII): [(VIII)+(IX)] in the polycondensation component is usually 1:15 to 15:1, preferably 1:10 to 10:1 and more preferably 1:5 to 3:1. In a preferred embodiment, the molar ratio of the second and third repeating units (VIII):(IX) is adjusted to 1:0.005 to 1:10, preferrably 1:0.01 to 1:1, in particular 1:0.01 to 1:0.2 and more preferably 1:0.01 to 1:0.1.

The groups A and D in the repeating units of Formulae (VII), (VIII) and (IX) of the polycondensation component are preferably represented by phenyl, 2-hydroxyphenyl, 3-hydroxyphenyl, 4-hydroxyphenyl, 2-methoxyphenyl, 3-methoxyphenyl, 4-methoxyphenyl, naphthyl, 2-hydroxynaphthyl, 4-hydroxynaphthyl, 2-methoxynaphthyl, 4-methoxynaphthyl, preferably phenyl. It is possible for A and D to be chosen independently of one another and also in each case to consist of a mixture of said compounds. The groups B and E, independently of one another, are preferably represented by an oxygen atom, O.

The radicals $R^1$, $R^2$, $R^3$ and $R^4$ can be chosen independently of one another and are preferably represented by H, methyl, ethyl or phenyl, particularly preferably by H or methyl and especially preferably by H.

Value a in the first polycondensation repeating unit of Formula (VII) is preferably represented by an integer from 5 to 280, in particular 10 to 160 and particularly preferably 12 to 120. Value b in the second and third repeating units (VIII) and (IX) is an integer from 0 to 10, preferably 1 to 7 and particularly preferably 1 to 5. The respective radicals, the length of which is defined by a and b, respectively, may consist of uniform building blocks, but a mixture of different building blocks may also be expedient. Furthermore, the radicals of the first, second and third repeating units of Formulae (VII) or (VIII) and (IX), independently of one another, may each have the same chain length, a and b each being represented by a value. It is preferred that mixtures having different chain lengths are present in each case so that the radicals of the repeating units in the polycondensate have different numerical values for a and, independently, for b.

Frequently, the phosphated polycondensate component has a weight average molecular weight of 4000 g/mol to 150 000 g/mol, preferably 10 000 to 100 000 g/mol and particularly preferably 20 000 to 75 000 g/mol.

Preferably, the phosphated polycondensation component is added to the slurry as an aqueous solution which contains about 2 to about 90% by weight of water and about 98 to about 10% by weight of dissolved dry matter, preferably about 40 to about 80% by weight of water and about 60 to about 20% by weight of dissolved dry matter, and more preferably about 45 to about 75% by weight of water and about 55 to about 25% by weight of dissolved dry matter. If desired other soluble, dry additives can also be dissolved in the same solution for convenient addition to the slurry, such as antifoaming agents.

In a particular embodiment, the invention furthermore contemplates a sodium, potassium, ammonium and/or calcium salt and preferably a sodium and calcium salt, of the phosphated polycondensation component.

A process for the phosphation of the polycondensation component is optionally carried out in the reaction mixture. This is to be understood as meaning that the phosphated polycondensation component formed in the reaction solution needs neither be purified nor isolated. The phosphation can be carried out before, during or after the polycondensation. Preferably both the phosphation and the polycondensation are carried out in the same reaction vessel.

In a preferred embodiment, the reaction mixture for synthesis of the polycondensation component includes at least a monomer of the first polycondensation repeating unit, a monomer of the third polycondensation repeating unit, and a further monomer having an aldehyde group and a phosphating agent. The monomer of the third polycondensation repeating unit is not the same as the monomer of the first polycondensation repeating unit. A portion of the monomer of the third polycondensation repeating unit is partially phosphated during the reaction and forms the monomer of the second polycondensation repeating unit as shown in Formula (VIIIa.) Each of the variables is defined in the same manner as for the corresponding polycondensation repeating unit above.

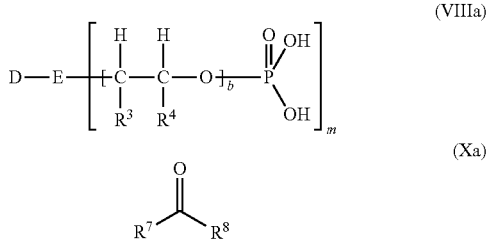

where $R^7$ units are identical or different and are represented by H, $CH_3$, COOH and/or a substituted or unsubstituted aromatic or heteroaromatic compound having 5 to 10 C atoms; and where $R^8$ units are identical or different and are represented by H, $CH_3$, COOH and/or a substituted or unsubstituted aromatic or heteroaromatic compound having 5 to 10 C atoms.

The present invention provides different variants of the reaction procedure. One possibility consists of first reacting the monomer of the third polycondensation repeating unit with a phosphating agent and subjecting the monomer of the second polycondensation repeating unit thus obtained to polycondensation with the monomers of the first and third polycondensation repeating units and the monomer of the fourth repeating unit. The monomer of the third polycondensation repeating unit may be present from an incomplete reaction during the phosphation reaction or can be deliberately added to the reaction mixture after the phosphation reaction.

However, it is also possible to subject the monomers of the first and third polycondensation repeating units and the further monomer to polycondensation and then to react the polycondensate product obtained with a phosphating agent. In another embodiment, the monomers of the first and third polycondensation repeating units, the monomer of the fourth repeating unit and the phosphating agent are reacted simultaneously. Polyphosphoric acid and/or phosphorous pentoxide are suitable phosphating agents. The polycondensation is carried out in the presence of an acidic catalyst, this preferably being sulfuric acid, methanesulfonic acid, para-toluenesulfonic acid or mixtures thereof.

The polycondensation and the phosphation are advantageously carried out at a temperature between 20 and 140° C. and a pressure between 1 and 10 bar. In particular, a temperature range between 80 and 110° C. has proved to be useful. The duration of the reaction may be between 0.1 and 24 hours, depending on temperature, the chemical nature of the monomers used and the desired degree of crosslinking. Once the desired degree of crosslinking has been reached, which can also be determined, for example, by measurement of the viscosity of the reaction mixture, the reaction mixture is cooled.

According to a particular embodiment, the reaction mixture is subjected to a thermal aftertreatment at a pH between 8 and 13 and a temperature between 60 and 130° C. after the end of the condensation and phosphation reaction. As a result of the thermal aftertreatment, which advantageously lasts for between 5 minutes and 5 hours, it is possible substantially to reduce the aldehyde content, in particular the formaldehyde content, in the reaction solution.

In a further particular embodiment, the present invention envisages subjecting the reaction mixture to a vacuum aftertreatment at pressures between 10 and 900 mbar after the end of the condensation and phosphation reaction, for reducing the aldehyde content. Other methods known to the person skilled in the art for reducing the formaldehyde content may also be used. An example is the addition of small amounts of sodium bisulfite, ethylene urea or polyethylenimine.

The phosphated polycondensates obtained by these processes can be used directly as the polycondensation component. In order to obtain a better shelf life and better product properties, it is advantageous to treat the reaction solutions with basic compounds. Preferably the reaction mixture is treated after the end of the polycondensation reaction with a basic sodium, potassium, ammonium or calcium compound. Sodium hydroxide, potassium hydroxide, ammonium hydroxide or calcium hydroxide are particularly useful, since it is preferred to neutralize the reaction mixture. Other alkali metal and alkaline earth metal salts and salts of organic amine are suitable as salts of the phosphated polycondensate components.

Mixed salts of the phosphated polycondensation components are prepared by reacting the polycondensates with at least two basic compounds. Thus, by a targeted choice of suitable alkali metal and/or alkaline earth metal hydroxides, it is possible by neutralization to prepare salts of the polycondensation components, with which the duration of the processability of aqueous suspensions of inorganic binders and in particular of concrete can be influenced. While a reduction in the processability over time is observable in the case of the sodium salt, a complete reversal of this behavior takes place in the case of the calcium salt of the identical polymer, a smaller water reduction (smaller slump) occurring at the beginning and increasing with time. As a result of this, sodium salts of the phosphated polycondensation components lead to a decrease in the processability over time of the binder-containing material, such as, for example, concrete, mortar or gypsum slurries, whereas the corresponding calcium salts lead with time to improved processability. By suitable choice of the amount of sodium and calcium salts of the phosphated polycondensates used, the development of the processability of binder-containing materials can thus be controlled as a function of time. Expediently, the corresponding phosphated polycondensation components, which consist of sodium and calcium salts, are prepared by reaction with a mixture of basic calcium and sodium compounds, in particular calcium hydroxide and sodium hydroxide.

According to the present invention, a catalyst used can also be separated off. This can expediently be affected via the salt formed during the neutralization. If sulfuric acid is used as the catalyst and the reaction solution is treated with calcium hydroxide, the calcium sulfate formed can be separated off, for example, in a simple manner by filtration. Furthermore, by adjusting the pH of the reaction solution to 1.0 to 4.0, in particular 1.5 to 2.0, the phosphated polycondensation component is separated from the aqueous salt solution by phase separation and can be isolated. The phosphated polycondensation component can then be taken up in the desired amount of water. Other methods known to the person skilled in the art, such as dialysis, ultrafiltration or the use of an ion exchanger, are also suitable for separating off the catalyst.

Additionally, it is advantageous that the methods of making the phosphated polycondensation components can be prepared by a very economical process, with no further purification of intermediates being required. In particular, no wastes which have to be disposed of form in the process according to the invention. Thus, the claimed process also constitutes further progress compared with the prior art from environmental points of view. The reaction mixture obtained can be put directly to the intended formulation optionally after treatment with basic compounds.

In a specific embodiment the slurry includes the dispersant component, the polycondensation components, at least one antifoaming agent and/or a component having a surface-active effect, the antifoaming agent and component having a surface-active effect being structurally different from one another.

The antifoaming agent is preferably selected from the group consisting of a mineral oil, a vegetable oil, a silicon oil, a silicon containing emulsion, a fatty acid, a fatty acid ester, an organic modified polysiloxane, a borate ester, an alkoxylate, a polyoxyalkylene copolymer, ethylene oxide (EO)-propylene oxide (PO) block polymer, acetylenic dials having defoaming properties and a phosphoric ester having the formula $P(O)(O—R^8)_{3-x}(O—R^9)_x$ where P represents phosphorus, O represents oxygen and $R^8$ and $R^9$ are, independently, a $C_2$-$C_{20}$ alkyl or an aryl group and x=0, 1, 2, whereby an alkyl group with $C_2$-$C_8$ is preferred. Preferably the antifoaming agent includes tri-alkylphosphate and more preferably triisobutylphosphate, a polyoxypropylene copolymer and a glycerol/alcohol acetate. Another embodiment of the slurry includes a mixture where the antifoaming agent includes a mixture of a tri-alkylphosphate and a polyoxypropylene copolymer.

The second optional component of the formulation, namely the surfactant, is preferably selected from the group consisting of a ethylene oxide/propylene oxide (EO/PO) block copolymer, a styrene/maleic acid copolymer, a fatty alcohol alkoxylate, an alcohol ethoxylate $R_{10}$—(EO)—H with $R_{10}$ being an aliphatic hydrocarbon group having from 1 to 25 carbon atoms, acetylenic dials, monoalkylpolyalkylenes, ethoxylated nonylphenols, alkylsulfates, alkylethersulfats, alkylethersulfonates, alkyl ether carboxylates. More preferably the surfactant component includes an alcohol having a polyalkylene group of a carbon chain length of 2 to 20 carbon atoms, with a preferred carbon chain length of $C_3$-$C_{12}$.

Prior to addition to the gypsum slurry, the dispersant component and the polycondensation component are optionally pre-mixed in an aqueous composition that includes the antifoaming agent component in free form and/or chemically or physically attached to the dispersing component and/or the polycondensation component. Any or all of these components can be added directly to the gypsum slurry without pre-blending.

In a further embodiment the antifoaming component is present in amounts of about 0.0002 to about 0.02% by weight and/or the surface-active component is present in amounts of about 0.0002 to about 0.02% by weight, based in each case on the total weight of the dry dispersants.

In another optional embodiment, in addition to the dispersing components, the polycondensation component and optionally the antifoaming agent or the surface-active component the slurry has at least one further compound. The further compound is preferably a polymer having a low charge, a neutral polymer or polyvinyl alcohol. This further compound and its role in systems containing calcium sulfate as hydraulic binder has been taught in the unpublished provisional European Patent application EP 08171022.0, herein incorporated by reference. The further compound is useful with gypsum compositions having certain clay contents.

The total concentration of the dispersant component and polycondensation component to be included in the slurry ranges from 0.0002 to 1.6% by weight of the inorganic binder, or ranges from 0.001 to 1.0% by weight. In some embodiments, ranges from 0.002 to 0.4% by weight can be utilized. Other embodiments utilize 0.01 to 1.0% by weight or 0.05 to 0.2% by weight. The ratio of the dispersant component to the polycondensate component ranges from about 1:99 to about 99:1.

Additional additives are also added to the slurry as are typical for the particular application to which the gypsum slurry will be put. Amounts of some additives are reported in pounds per 1000 ft² of board ("MSF"), based on a ½ inch (12 mm) gypsum panel.

Dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate, aluminum sulfate and sodium bisulfate are also suitable accelerators. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators. Set accelerators decrease hydration time and decrease fluidity.

Another accelerator, known as wet gypsum accelerator or WGA, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m²) of board product. A specific example of a set retarder in some embodiments of the invention is Versenex 80, which is a pentasodium diethylenetriaminepentaacetate (Dow Chemical, Midland, Mich.).

Set retarders (up to about 2 lb./MSF (9.8 g/m²)) are optionally used to prevent crystal formation in the mixer and to delay thickening of the gypsum slurry. The addition of the set retarder results in improved flowability of the slurry through the mixer because the thickening is delayed. Thus the amount of water in the slurry can be reduced. This water reduction effect is in addition to the water reduction effect provided by the dispersants. This effect is observed when retarder is used in amounts as little as 0.008% by weight based on the weight of dry calcined gypsum.

In some embodiments of the invention, additives are included in the gypsum slurry to adjust one or more properties of the final product. Additives are used in the manner and amounts as are known in the art. Concentrations are reported in amounts per 1000 square feet of finished board panels ("MSF"). Reinforcing materials such as glass fibers are optionally added to the slurry in amounts of up to 11 lb./MSF (54 g/m$^2$). Up to 15 lb./MSF (73.2 g/m$^2$) of paper fibers are also added to the slurry. Wax emulsions are added to the gypsum slurry in amounts up to 90 lb./MSF (0.4 kg/m$^2$) to improve the water-resistency of the finished gypsum board panel. Sugars, such as dextrose, are used to improve the paper bond at the ends of the boards. Polysiloxanes are used for water resistance. If stiffness is needed, boric acid is commonly added. Fire retardancy can be improved by the addition of vermiculite. These and other known additives are useful in the present slurry and wallboard formulations.

Modifiers are known that increase the efficacy of polycarboxylate dispersants. They are described in detail in U.S. Pat. No. 7,608,347, herein incorporated by reference, and U.S. Pat. No. 7,767,019, previously incorporated by reference. When used in combination with the dispersant, the addition of modifiers allows the amount of dispersant to be reduced to obtain a desired slump size or produces a greater slump size at the same dispersant dosage. Examples of suitable modifiers are lime, carbonates, hydroxides, phosphates, phosphonates and silicates. Lime and soda ash are used in some embodiments due to their reasonable cost and ready availability.

In embodiments of the invention that employ a foaming agent to yield foam voids in the set gypsum-containing product to provide lighter weight, any of the conventional foaming agents known to be useful in preparing foamed set gypsum products can be employed. Many such foaming agents are well known and readily available commercially, e.g. the HYONIC line of soap products from GEO Specialty Chemicals, Ambler, Pa. Any foaming agents are useful alone or in combination with other foaming agents. Generally, soaps do not affect hydration time or fluidity directly. However, soap addition can reduce fluidity when small bubbles are produced that tightly pack together and resist flow.

An example of a combination includes a first foaming agent which forms a stable foam and a second foaming agent which forms an unstable foam. The first foaming agent is optionally a soap with an alkyl chain length of 8-12 carbon atoms and an ethoxy group chain length of 1-4 units. The second foaming agent is optionally an unethoxylated soap with an alkyl chain length of 6-16 carbon atoms. Regulating the respective amounts of these two soaps allows for control of the panel foam void structure until 100% stable soap or 100% unstable soap is reached. Foams and a preferred method for preparing foamed gypsum products are disclosed in U.S. Pat. No. 5,643,510, herein incorporated by reference.

If foam is added to the product, the polycarboxylate dispersant is optionally divided between the gauging water and the foam water or two different dispersants are used in the gauging water and the foam water prior to its addition to the calcium sulfate hemihydrate. This method is disclosed in co-pending application U.S. Ser. No. 11/152,404, entitled, "Effective Use of Dispersants in Wallboard Containing Foam", previously incorporated by reference.

A trimetaphosphate compound is added to the gypsum slurry in some embodiments to enhance the strength of the product and to improve sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. Nos. 6,342,284 and 6,632,550, both herein incorporated by reference. Exemplary trimetaphosphate salts include sodium, potassium or lithium salts of trimetaphosphate, such as those available from Astaris, LLC., St. Louis, Mo. Care must be exercised when using trimetaphosphate with lime or other additives that raise the pH of the slurry. Above a pH of about 9.5, the trimetaphosphate loses its ability to strengthen the product and the hydration rate of the slurry becomes severely lengthened.

Other potential additives to the wallboard are biocides to reduce growth of mold, mildew or fungi. Depending on the biocide selected and the intended use for the wallboard, the biocide can be added to the covering, the gypsum core or both. Examples of biocides include boric acid, pyrithione salts and copper salts. Use of pryithione salts in gypsum panels are disclosed in U.S. Pat. No. 6,893,752, herein incorporated by reference.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Pregelatinized starches such as USG95 (United States Gypsum Company, Chicago, Ill.) are also optionally added for core strength.

Any of these components can be added in any of the ways components are typically added to a gypsum slurry. Components may be added at the gauging water inlet, the dry additive inlet, the wet additive inlet, the discharge conduit and even the vent for allowing excess air to escape the mixer. The components may be added alone, together with other dry ingredients, together with other wet ingredients, with the foam water, in the shear pump with other additives, or directly into the mixer alone. Some components may be pre-blended with each other or not pre-blended and added individually.

In operation, the calcined gypsum is moved on a conveyor toward a mixer. Prior to entry into the mixer, dry additives, such as dry set accelerators, are added to the powdered calcined gypsum. Some additives are added directly to the mixer via a separate line. Trimetaphosphate is optionally added using this method. Other additives are optionally added directly to the mixing or gauging water. This is particularly convenient where the additives are supplied in liquid form. For most additives, there is no criticality regarding placing the additives in the slurry, and they may be added using whatever equipment or method is convenient. When using some polycarboxylate dispersants, it is important to add the dispersant to the water prior to addition of the stucco.

The ingredients are mixed in a high shear mixer, such as a pin mixer, until a homogeneous slurry is obtained. Some slurries have no foam added. In some embodiments, a foaming agent is added to the mixer and foam is generated in situ during mixing, or pregenerated foam is added to the mixer. In other embodiments, slurry is discharged into a conduit where, optionally, pregenerated foam is added to the slurry. Foam is optionally added to the slurry by allowing it to flow over a foam ring having multiple foam outlets. This technique for foam addition is discussed in U.S. Pat. No. 5,683,635, herein incorporated by reference. After or during foam addition, the slurry travels down the conduit where it is discharged as continuously onto a conveyor.

At or near the conveyor, a sample of the slurry is periodically taken to test the properties of the slurry and the set gypsum. A slump test is performed to determine the fluidity of the slurry. The temperature rise setting time is determined in accordance with CSA A82.2OM 1977 Physical Testing of Gypsum Plasters, Section 5.3, herein incorporated by reference. Since hydration of calcined gypsum is an exothermic reaction, the temperature rise in the slurry from the initial mixing temperature is indicative of the degree of set in the slurry.

Optionally, the conveyor is lined with a facing material onto which the slurry is deposited. Common facing materials include, but are not limited to paper or cardboard having one or multiple plies, fiberglass mats, scrims and plastic films. A second facing material optionally covers the slurry after it has been deposited to form a "sandwich" of the slurry between the two facing materials. The first facing material can be the same or different from the second facing material. Finished panels may include none, one or two facing materials. In some embodiments, a separate edge wrap material is placed on the edge facings of the panel between the slurry and the facing material. Where no facing material is used, the slurry is deposited directly onto the conveyor surface.

After the slurry and any optional facing materials are in place on the conveyor, it is formed into a panel. The term "panel" is intended to refer to a piece of material having a thickness that is smaller than either the length or the width. The slurry mass passes under a screed bar at a forming station to spread the slurry evenly over the surface, to flatten the slurry and to make a continuous gypsum ribbon of consistent thickness. Commonly, the screed bar is set to thicknesses of ½ (12 mm) or ⅝ (15 mm) of an inch, but thickness as small as ¼ inch (6 mm) are known and panel thickness can exceed one inch (25 mm) in thickness. Edge formers smooth the edge of the slurry mass and fold the edge of the facing material, when present, to cover the edge. When the ribbon has achieved a sufficient set strength, it is cut into lengths to form the panel. Preferably a surface of the panel is generally rectangular in shape. To speed drying of the panels, they are transferred into a kiln where they are dried at elevated temperatures.

At the knife where the panels are cut, a sample of the ribbon is taken periodically to determine the void structure of the set gypsum. The sample is cut or broken open to inspect the interior structure.

Based on the results of the production tests, adjustments are made in process parameters to improve the panel quality and/or manufacturing efficiency. If the hydration time is not at the target value, changes in process variables such as, the amount of set accelerator, the amount of dispersant component or the amount of the polycondensate product component are useful. Fluidity of the slurry is affected by at least the amount of set accelerator, the amount of the polycondensate product component, the amount of the dispersant component and water. When correction in the foam structure is required, adjustments can be made to the amount of the dispersant component, the amount of the polycondensate product component, the amount of soap, the ratio of unstable to stable soap and the amount of antifoaming agents used in the slurry.

Adjusting the relative amounts of the dispersant component and the polycondensate component, or the relative amounts of any two dispersants, is useful in controlling one or more properties of the gypsum slurry or the resulting gypsum panel. A dispersant A and a dispersant B are preferably different dispersant types as a variety of repeating units are more likely to have different effects on the gypsum slurry. Examples of dispersant types that could be used include the dispersant component and the polycondensate component described herein, formaldehyde condensates such as BNS and MFS dispersants.

To be most effective, the dispersants should affect the efficacy, fluidity and bubble structure of the gypsum slurry differently. This is not to say that one dispersant need affect a given property in the opposite way as the other dispersant. One dispersant may have no effect on a property. However, the dispersants are selected to have effects of different magnitude with respect to the properties of interest. For example, some polycarboxylate ether dispersants strongly increase the fluidity of the slurry and tend to stabilize the bubbles. Naphthalene sulfonate dispersants increase fluidity to a lesser extent than the polycarboxylate but tend to destabilize the bubbles. These two dispersants would be suitable for use in this process. Two dispersants that would not be suitable for use together would be those that have the same effect on each property being considered. In this case, changing the ratio of the dispersants would not result in a change in the process conditions.

Dispersants having additional repeating units or pendant groups that act on properties of the slurry are also suitable. Particularly, dispersants are known to have antifoaming agents, surface-active groups or elements that assist the dispersant perform better in the presence of certain impurities, such as clay contained in some stuccos.

Cases are also considered where either dispersant A, dispersant B or both are blends of dispersants. The dispersant component and the polycondensate component are available as a blend of these two dispersants. To obtain the ability to independently control the amount of the dispersant component relative to the polycondensate component, two different dispersant blends can be used. Here the dispersant blend A is made of the dispersant component and the polycondensate in a ratio of more than 1:1 on a weight basis. The dispersant blend B is prepared with the dispersant component and the polycondensate in a ratio of less than 1:1 on a weight basis.

Dispersant A and dispersant B are then combined in different amounts to change the ratio of the dispersant component to the polycondensate component. Dispersants A and B are optionally combined prior to addition to the gypsum slurry. During the manufacture of the gypsum boards, the relative amounts of dispersant A and dispersant B are varied to obtain the desired properties in response to the tests and observation of the slurry and panel product.

For example, consider a case where the dispersant component is a Melflux 2661 type PCE comb-branched copolymer having polyether side chains ("dispersant A") and where the dispersant component and the polycondensate component ("dispersant B") both include an antifoaming component such that its characteristic is to destabilize the foam. In this example, the target core structure is void Structure B.

If the slump test indicates that the slurry is not as fluid, the amount of dispersant A can be increased to increase the slump. However, increasing the amount of dispersant A also increases the hydration time and decreases the foam stability necessary to maintain void Structure B. To maintain the higher foam stability, the amount of soap that produces stable foam should be increased and the amount of soap that produces unstable foam should be decreased. Hydration time can be adjusted by varying the amount of set accelerator.

In certain cases, it is not sufficient to vary only one of Dispersant A or Dispersant B. If in the previous example, the manufacturing facility were already running at 100% stable soap, it would not be possible to vary the soap ratio alone to maintain the same bubble size distribution as from before the amount of Dispersant A were increased. The total amount of soap that forms stable foam can be increased, however, the use of excessive amounts of soap causes problems in bonding of the gypsum panel to the facing material and/or the formation of blisters. Similarly, it is possible that the retardation may be too extreme that the continued addition of set accelerator may not be able to control the hydration time. In cases such as these, it is beneficial also to independently vary the amount of the Dispersant B, and thus the ratio of the dispersant component to the polycondensate component. Dispersant B affects the fluidity almost as much as Dispersant A but has less of an effect on the foam void size and the hydration time than Dispersant A. Changes that would need to be made in the slurry composition to compensate for the effects of dispersant changes are reduced. This technique is particularly helpful in cases where freedom to vary one of the other additives is limited. It should be noted that use of the technique is not limited to circumstances such as those discussed above. Varying the dispersant ratio should be considered any time it is necessary to make corrections in the slurry or product properties.

EXAMPLE 1

Synthesis of Polycondensation Component

EXAMPLE 1.1

A reactor equipped with a stirrer and a heating mantle is filled with 600 parts of poly(ethyleneoxide)monophenylether (average molecular weight 5000 g/mol), 47.2 parts of concentrated methane sulfonic acid, 12 parts of water, 110 parts of α-phenyl-ω-hydroxypoly(oxy-1,2-ethanediyl) phosphate (average molecular weight 368 g/mol) and 14.7 parts of paraformaldehyde. This reaction mixture is stirred at 115° C. for 3 hours. After cooling, 830 parts of water are added the reaction mixture is neutralized with 50% sodium hydroxide solution to a pH value of 6.5 to 7. The resin is a light yellow colored, clear and aqueous polymer solution with a solid concentration of 40% by weight. To the stirred solution (500 rpm) of the polymeric dispersant the antifoaming agent and the surfactant are added at ambient temperature (25° C.). The amounts of the materials are shown in Table 1 and are in percent by weight of the solution.

EXAMPLE 1.2

A reactor equipped with a stirrer and a heating mantle is filled with 26 parts of polyphosphoric acid and heated to 90° C. Within 15 min 44.2 parts of 2-phenoxyethanol are charged into the reactor. After 1 hour, 400 parts of poly(ethyleneoxide)monophenylether (average molecular weight 5000 g/mol), 31.4 parts of concentrated methane sulfonic acid, 20 parts of water and 12.6 parts of paraformaldehyde are added. This reaction mixture is stirred at 105° C. for 6 hours. After cooling, 550 parts of water are added and the reaction mixture is neutralized with 50% sodium hydroxide solution to a pH value of 6.5 to 7. The resin is a light brown colored, clear and aqueous polymer solution with a solid concentration of 40% by weight. To the stirred solution (500 rpm) of the polymeric dispersant the antifoaming agent and the surfactant are added at ambient temperature (25° C.). The amounts of the materials shown in Table 1 are in percent by weight of the solution.

EXAMPLE 1.3

A reactor equipped with a stirrer and a heating mantle is filled with 51.6 parts of polyphosphoric acid and heated to 90° C. Within 15 min 90 parts of 2-phenoxyethanol are charged into the reactor. After 1 hour, 322 parts of poly(ethyleneoxide)monophenylether (average molecular weight 5000 g/mol), 300 parts of poly(ethyleneoxide)monophenylether (average molecular weight 2000 g/mol), 42.1 parts of concentrated methane sulfonic acid, 16.8 parts of water and 28.5 parts of paraformaldehyde are added. This reaction mixture is stirred at 105° C. for 6 hours. After cooling, 800 parts of water are added and the reaction mixture is neutralized with 50% sodium hydroxide solution to a pH value of 6.5 to 7. The resin is a light brown colored, clear and aqueous polymer solution with a solid concentration of 40% by weight. To the stirred solution (500 rpm) of the polymeric dispersant the antifoaming agent and the surfactant are added at ambient temperature (25° C.). The amounts of the materials shown in Table 1 are in percent by weight of the solution.

EXAMPLE 2

Formulation of Sample Additive Blends

Examples E1 to E20 were prepared by mixing the polycondensation component ("polycondensate" of Table 1) with equivalent amounts (wt. %) of the dispersants according to Table 1. MELFLUX® PCE 239 L 45% N.D, MELFLUX® 2500 L 45% N.D., MELFLUX® 2453 L 44% N.D. MELFLUX® 2424 L 50% N.D., MELFLUX® AP 120 L 40%, and SOKALAN® DS5009 X are polycarboxylate ether dispersants available from BASF Construction Polymers GmbH, Germany. MELCRETE® 500 L is a naphthalene sulfonate dispersant (BNS) available from BASF Construction Polymers GmbH, Tröstberg, Germany. MELMENT® L 15 G is a melamine sulfonate-formaldehyde condensate (MFS) available from BASF Construction Polymers GmbH. The non-ionic polymers N1 and N2 are able to maintain the fluidity of a cement composition and are synthesized according to the still unpublished application U.S. Ser. No. 12/477,637, herein incorporated by reference. Examples C7, C8 and C9 are presented in Table 2 of Example 3.

TABLE 1

| Formulation (E: Invention; C: Comparison) | Polycondensate according to example | Dispersant | Molar Ratio of polycondensate to dispersant | Solid content (wt. %) | Stability over 3 months |
|---|---|---|---|---|---|
| E1 | C7 | Melflux PCE 239 L | 2/1 | 35 | stable |
| E2 | C8 | Melflux PCE 239 L | 2/1 | 35 | stable |
| E3 | C7 | BNS | 1/1 | 25 | stable |
| E4 | C8 | BNS | 1/1 | 25 | stable |

TABLE 1-continued

| Formulation (E: Invention; C: Comparison) | Polycondensate according to example | Dispersant | Molar Ratio of poly-condensate to dispersant | Solid content (wt. %) | Stability over 3 months |
|---|---|---|---|---|---|
| E5 | C9 | BNS | 1/1 | 25 | stable |
| E6 | C8 | Melflux 2500 L | 1/1 | 40 | stable |
| E7-1 | C8 | Melflux PCE 493 L | 3/1 | 40 | stable |
| E7-2 | C8 | Melflux PCE 493 L | 1/3 | 40 | stable |
| E8-1 | C8 | Melflux PCE 239 L | 3/1 | 35 | stable |
| E8-2 | C8 | Melflux PCE 239 L | 1/3 | 35 | stable |
| E9 | C8 | BNS | 2/1 | 20 | stable |
| E10 | C8 | Sokalan 5009X | 2/1 | 35 | stable |
| E11 | C8 | Melflux AP 120 L | 2/1 | 40 | stable |
| E12 | C8 | Melment L 15 G | 2/1 | 40 | stable |
| E13 | C8 | N1 | 2/1 | 30 | stable |
| E14 | C8 | Melflux PCE 493 L | 2/1 | 40 | stable |
| E15 | C9 | Melflux PCE 493 L | 2/1 | 40 | stable |
| E16 | C7 | BNS | 3/1 | 25 | stable |
| E17 | C7 | Melflux 2500 L | 1/1 | 40 | stable |
| E18 | C7 | Melflux 2453 L | 1/1 | 40 | stable |
| E19 | C7 | Melflux 2424 L | 1/1 | 40 | stable |
| E20 | C8 | N2 | 2/1 | 30 | stable |
| C1 | — | Melflux 2500 L | | 40 | |
| C2 | — | Melflux PCE 239 L | | 35 | |
| C3 | — | Melflux PCE 493 L | | 40 | |
| C4 | — | 1:1 mixture of Melflux 2500 L/BNS | | 25 | gel formation |

EXAMPLE 3

Formulations of Polycondensation Components with Surface-Active Properties and Antifoaming Agents In the following admixtures, antifoaming agent A1 was a polypropyleneglycol commercially available as PLURIOL® P2000 and, antifoaming agent A2 an alkoxylated alcohol commercially available as DEGRESSAL® SD23 and antifoaming agent A3 a carboxylic ester commercially available as DEGRESSAL® SD30 all from BASF SE (Ludwigshafen, Germany). Surfactant S1 was an ethoxylated oxo-alcohol commercially available as LUTENSOL® 106 from BASF SE (Ludwigshafen, Germany). Surfactant S2 is a styrene/maleic acid comb-branched copolymer with polyether side chains which was synthesized according to EP 0306449 A2, herein incorporated by reference.

TABLE 2

| Solution (E: Invention; C: Comparison) | Poly-condensate according to example | Antifoaming agent (wt.-%) | | | Surfactant (wt.-%) | | Stability over 3 months at RT |
|---|---|---|---|---|---|---|---|
| | | A1 | A2 | A3 | S1 | S2 | |
| E21 | E1 | | 0.4 | | 0.6 | | + |
| E22 | 1.1 | 0.2 | | | | 0.3 | + |
| E23 | 1.1 | | | 0.4 | 0.6 | | + |
| E24 | E2 | 0.2 | | | 0.3 | | + |
| E25 | 1.2 | 0.2 | | | | 0.3 | + |
| E26 | 1.2 | | | 0.4 | 0.8 | | + |

TABLE 2-continued

| Solution (E: Invention; C: Comparison) | Poly-condensate according to example | Antifoaming agent (wt.-%) | | | Surfactant (wt.-%) | | Stability over 3 months at RT |
|---|---|---|---|---|---|---|---|
| | | A1 | A2 | A3 | S1 | S2 | |
| E27 | 1.2 | | | 0.2 | | 0.3 | + |
| E28 | 1.1 | | | 0.2 | | 0.3 | + |
| E29 | 1.3 | | | 0.2 | | 0.3 | + |
| E30 | E1 | | 0.2 | | | 0.3 | + |
| E31 | E2 | | 0.2 | | | 0.3 | + |
| C5 | 1.1 | 0.4 | | | | | -)* |
| C6 | 1.2 | 0.4 | | | | | -)* |
| C7 | 1.1 | None | None | None | None | None | n.a. |
| C8 | 1.2 | None | None | None | None | None | n.a. |
| C9 | 1.3 | None | None | None | None | None | n.a. |

)* phase separation within two days

EXAMPLE 4

Efficacy and Retardation of Additives in Gypsum

Combinations of dispersant components and polycondensation components were tested in the lab to determine dispersant efficacy and set retardation in a stucco slurry. Six hundred grams of stucco calcined from a synthetic gypsum produced by flue gas desulfurization were measured for each test. Other components were added in amounts of Table 1. CSA is a set accelerator as described above. The listed amount of water included a measured amount of gauging water plus water included in any of the additives. Both the dispersant component and the polycondensation component were diluted to 20% component solids by weight dispersed in water. The total dosage of the additive formulation blend shown in Table 3 was measured as weight of the component solids based on the weight of the dry stucco.

Composition of the test samples are shown in Table 3. One blend component was MELFLUX® PCE 652 (hereinafter "PCE"), a commercially available polycarboxylate ether dispersant available from BASF Construction Polymers, GmbH (Tröstberg, Germany). Melflux PCE 652 is a polycarboxylate ether dispersant combined with an antifoaming agent. Two different blends of the polycondensation component with the surfactant of the S2 type and an antifoaming agent, labeled EPPR 395, and EPPR 568 (BASF Construction Polymers, Tröstberg, Germany), were prepared according to Example 3. Samples EPPR 395 and EPPR 568 were made of the same base polymer, however, EPPR 395 had four times the amount of antifoaming agent as EPPR 568. Hereinafter, "EPPR" refers to blends of the polycondensation product, antifoaming agent and a comb-branched copolymer with polyether side chains.

Gauging water and the additive formulation blend were placed in the bowl of a HOBART® Brand mixer equipped with a mixing paddle and set on mixing speed 2 for the entire procedure. The water and additive formulation blend were stirred thoroughly to ensure a complete mixing of these ingredients.

The amount of CSA accelerator was adjusted at each dosage to give an initial stiffening rate of 2 minutes. Stucco was preblended in a bag with the CSA, then slowly and evenly added to the contents of the mixing bowl within 15 seconds. The stucco in the mixing bowl was allowed to soak for 15 seconds. After raising the mixer bowl, the mixer was started and mixed for 25 seconds. During mixing, foam was added to the slurry for the duration listed in Table 4 as described below. Initiation of foam addition was timed so that the foam addition just completed at the end of the mixing period. The slurry was mixed for an additional 5 seconds after foam addition was complete.

When mixing was completed, the mixer was stopped and a portion of the slurry was immediately poured into a damp 2 inch diameter by 4 inch tall cylinder placed on a plastic sheet, slightly overfilling the cylinder. Excess material was screeded from the top, then the cylinder was lifted up smoothly, allowing the slurry to flow out the bottom, forming a patty. The patty was measured (±1 mm) in two directions 90° apart, and the average of the two measurements was reported as the patty diameter. A second sample of the slurry was poured into a cup of constant volume and weighed to determine the cup weight. The wet density was calculated from the weight of slurry in the cup and the known cup volume. After complete hydration, the sample of gypsum from the cup was broken open to determine the size and distribution of internal voids.

TABLE 3

Test Slurry Compositions

| | | | Additive Formulation Blend | | | |
|---|---|---|---|---|---|---|
| Run | Water (g) | CSA (g) | EPPR Type | EPPR Amount, g | PCE Amount, g | Ratio, EPPR:PCE | Dosage (%) |
| 48 | 456 | 0.75 | 395 | 1.50 | 0 | 100:0 | 0.050 |
| 51 | 456 | 0.70 | 395 | 0.96 | 0.32 | 75:25 | 0.043 |
| 52 | 456 | 0.70 | 395 | 0.56 | 0.56 | 50:50 | 0.037 |
| 58 | 456 | 0.70 | 395 | 0.22 | 0.67 | 25:75 | 0.030 |
| 60 | 456 | 0.75 | — | 0 | 0.83 | 0:100 | 0.028 |
| 6 | 420 | 0.85 | 395 | 3.00 | 0 | 100:0 | 0.100 |
| 57 | 420 | 0.95 | 568 | 1.97 | 0.66 | 75:25 | 0.088 |
| 10 | 420 | 1.00 | 568 | 1.20 | 1.20 | 50:50 | 0.080 |
| 15 | 420 | 1.10 | 568 | 0.52 | 1.57 | 25:75 | 0.070 |
| 20 | 420 | 1.20 | — | 0 | 1.95 | 0:100 | 0.065 |
| 19 | 360 | 0.90 | 395 | 6.00 | 0 | 100:0 | 0.200 |
| 61 | 360 | 1.35 | 568 | 4.28 | 1.42 | 75:25 | 0.190 |
| 26 | 360 | 1.65 | 568 | 2.40 | 2.40 | 50:50 | 0.160 |
| 31 | 360 | 2.10 | 568 | 1.05 | 3.15 | 25:75 | 0.140 |
| 37 | 360 | 2.60 | — | 0 | 4.13 | 0:100 | 0.138 |
| 68 | 324 | 0.80 | 568 | 9.00 | 0 | 100:0 | 0.300 |
| 35 | 324 | 0.80 | 395 | 9.00 | 0 | 100:0 | 0.300 |
| 70 | 324 | 1.90 | 568 | 6.41 | 2.14 | 75:25 | 0.285 |
| 40 | 324 | 2.60 | 568 | 3.45 | 3.45 | 50:50 | 0.230 |
| 41 | 324 | 3.50 | 568 | 1.50 | 4.50 | 25:75 | 0.200 |
| 46 | 324 | 7.50 | — | 0 | 6.45 | 0:100 | 0.215 |

A foam generator was used to pregenerate foam for addition to the slurry to produce a predetermined target wet density. Foam was generated at the rate of 136 g/minute at an air flow of 2.0 L/min and foam density of 0.065 g/cm$^3$. The soap was supplied at the concentration shown in Table 4. It was a mixture of 25AS (forms unstable foam) and PFM33 (forms stable foam) at the stated ratio for each run. The duration of the foam addition, reported below as the "foam time" was determined by trial and error to achieve a consistent target density.

TABLE 4

Foam Addition and Test Results

| Run | Slump (cm) | Stiffening Time | Cup Wt. (g) | Soap (25AS:PFM33) | Foam Time(s) |
|---|---|---|---|---|---|
| 48 | 17.8 | 2:05 | 228.75 | 0.5% (100:0) | 10 |
| 51 | 17.8 | 2:10 | 219.01 | 0.5% (100:0) | 11 |
| 52 | 18.3 | 2:10 | 224.96 | 0.5% (100:0) | 10 |
| 58 | 18.0 | 2:10 | 224.49 | 0.5% (100:0) | 10 |
| 60 | 17.7 | 2:10 | 225.57 | 0.5% (100:0) | 10 |
| 6 | 18.1 | 2:10 | 218.60 | 0.5% (90:10) | 11 |
| 57 | 17.8 | 2:10 | 216.49 | 0.5% (100:0) | 11 |
| 10 | 18.2 | 2:15 | 213.82 | 0.5% (90:10) | 11 |
| 15 | 18.0 | 2:10 | 218.24 | 0.5% (75:25) | 11 |
| 20 | 17.8 | 2:10 | 218.97 | 0.5% (60:40) | 11 |
| 19 | 18.3 | 2:10 | 201.70 | 0.5% (60:40) | 14 |
| 61 | 18.0 | 2:15 | 202.82 | 0.5% (70:30) | 14 |
| 26 | 18.0 | 2:15 | 200.45 | 0.5% (55:45) | 14 |
| 31 | 17.8 | 2:15 | 204.28 | 0.5% (0:100) | 14 |
| 37 | 17.8 | 2:20 | 201.91 | 0.7% (0:100) | 13 |
| 68 | 18.0 | 2:10 | 195.81 | 0.5% (70:30) | 15 |
| 35 | 17.9 | 2:10 | 192.03 | 0.7% (0:100) | 15 |
| 70 | 17.9 | 2:05 | 197.01 | 0.5% (70:30) | 15 |
| 40 | 17.7 | 2:10 | 195.10 | 0.7% (0:100) | 14 |
| 41 | 18.1 | 2:15 | 194.03 | 0.7% (0:100) | 14 |
| 46 | 17.7 | 2:35 | 200.35 | 0.8% (0:100) | 13 |

Figure 4:
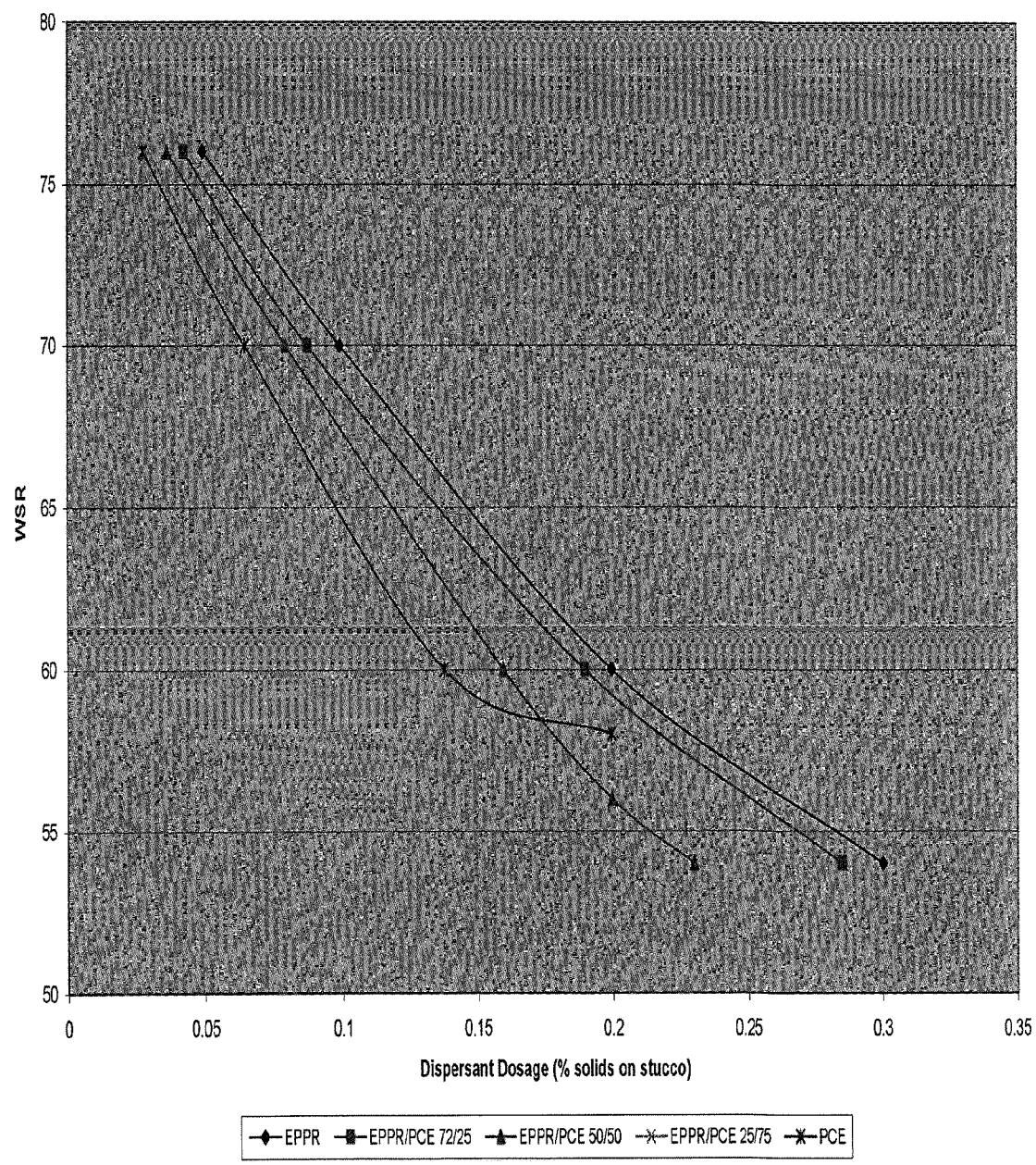
FIG. 4 is a graphic representation of the amount of dispersant from Table 1 used at various water to stucco ratios using several different dispersant ratios.

Results from these tests are shown graphically in FIG. 4. The graph shows the amount of dispersant needed to produce a slurry of consistent viscosity (as shown by the slump test) and set time. Tests were performed with various blends at different number of water to stucco ratios.

Figure 5:
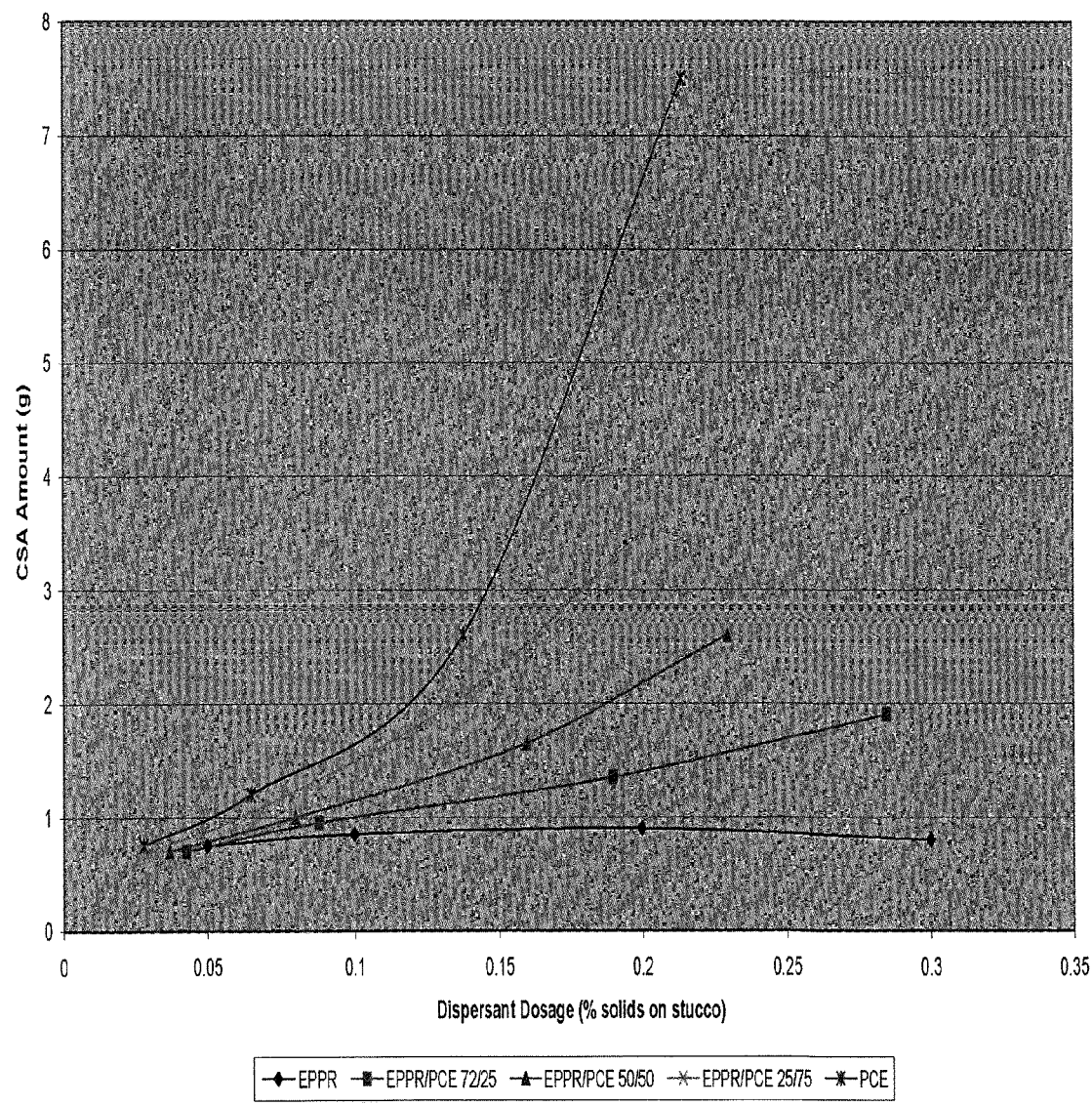
FIG. 5 is a graphic representation of the amount of dispersant used at various amounts of set accelerator for several different dispersant ratios.

Blends of EPPR 568 and PCE or EPPR 395 and PCE affect the efficacy of the combination in addition to the retardation. When looking at efficacy or retardation by itself, PCE has greater efficacy and both EPPR samples minimize set retardation. At constant hydration time, using a blend of EPPR 568 and PCE reduces set retardation and results in reduction in the amount of CSA accelerator that was required compared to slurries having PCE alone. However, as seen in FIG. 5. at very low total dispersant dosage levels, around 0.05%, the change in accelerator amount between the blends is minimal, implying that at low concentrations, differences in set retardation between the two dispersants is minimal. Therefore, the use of PCE by itself or blends of EPPR 568/PCE with a higher PCE ratio would be the most advantageous at low dosage levels to take advantage of the high efficacy of the PCE.

For moderate water reduction using higher total dispersant dosages (around 0.15% to 0.25%), a 1:1 blend of PCE:EPPR 568 is useful to balance the amount of water reduction with the set accelerator usage. When trying to achieve even greater water reduction by using much higher total dispersant dosages (greater than 0.25%), it would be more advantageous to use a high ratio of EPPR 568:PCE due to its reduced set retardation.

Figure 6:
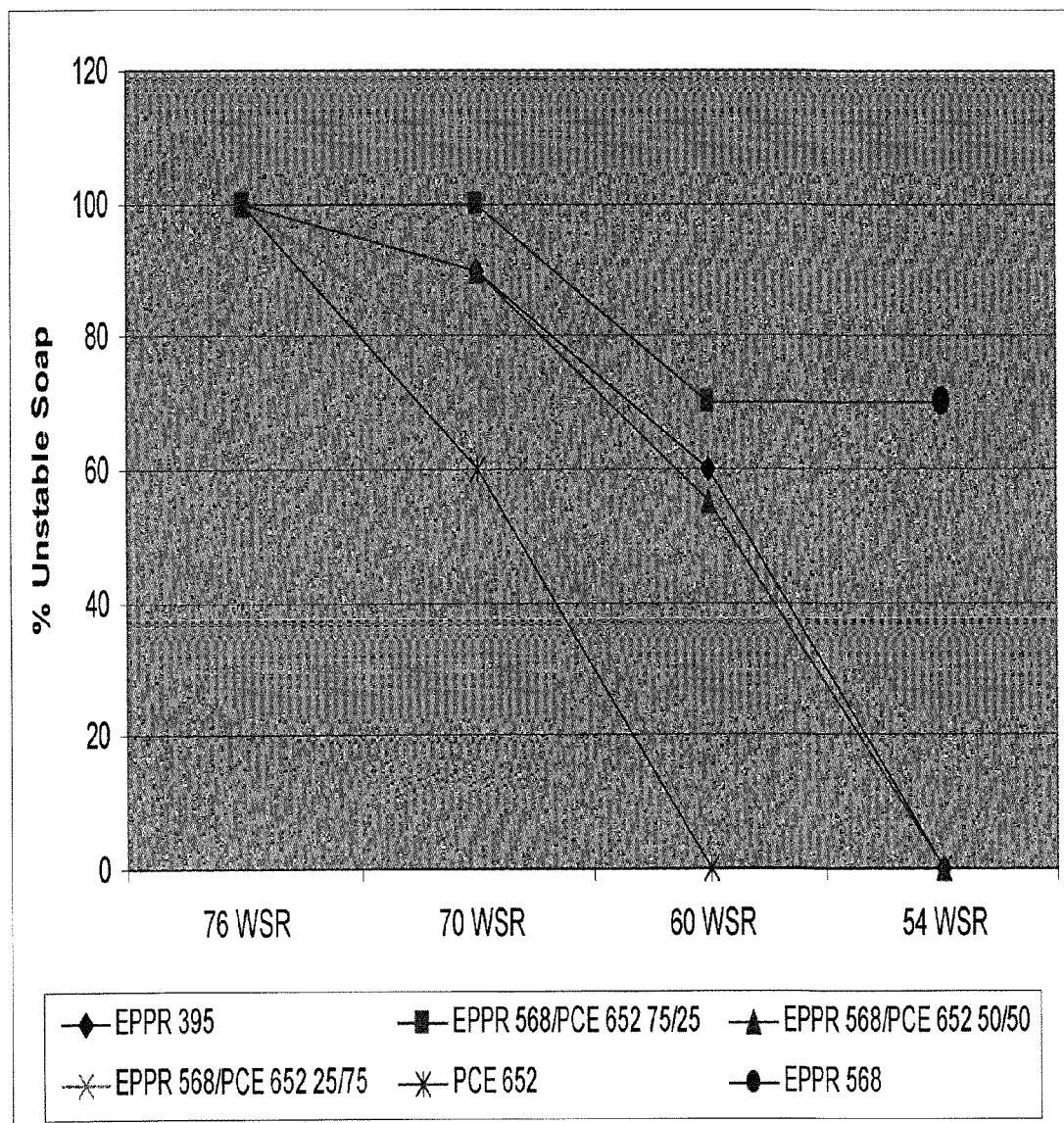
FIG. 6 is a graphic representation of the ratio of soap that produces unstable foam to soap that produces stable foam at various water to stucco ratios for several different dispersant ratios.

Blends with higher PCE amounts required more stable soap to produce a suitable void structure at a constant hydration time and fluidity. Conversely, as more EPPR 395 or EPPR 568 was used in the blend, more unstable soap was needed to maintain the void Structure B. The trend was evident in FIG. 6 at the 70 (420 g water), 60 (360 g water), and 54 (324 g water) WSRs, especially noticeable at the 60 and 54 WSRs. At the lowest WSR tested, only the blend of 75% EPPR 568/25% PCE allowed reasonable control of the bubble structure at the original dosage. Blends with lesser amounts of EPPR 568 or EPPR 395 all required 100% stable soaps at higher concentrations. For example, at the 60 WSR, the EPPR 568/PCE 25/75 blend unstable ratio increased from 0% to about 60% for the EPPR 568/PCE 50/50 blend, which is a considerable change. A similar increase was observed at the 54 WSR with EPPR 568/PCE 50/50 blend to the EPPR 568/PCE 75/25 blend from an unstable ratio of 0% to 70% respectively.

This demonstrates the versatility of using the different blends in order to be able to control core void size. Changes can be made in the blend more towards PCE if larger void sizes are required and changed more towards EPPR if smaller void sizes are required. This allows for even more precise control over the foam bubble size over a wide range of operating parameters. Some starches are known to destabilize the foam, increasing the complexity of the process. Increasing the ratio of EPPR to PCE stabilizes the foam without having to increase the amount of stable soap. Better control over the bubble size is obtained without going to the extreme ends of the unstable:stable soap ratio or soap concentrations.

As previously mentioned, when only EPPR 568 is being used to achieve water reduction, the extent of the water reduction can be limited by the adverse effects on foam void structure. At higher WSRs and constant dispersant usage, the dispersant with its antifoaming agent are less concentrated. Dilution of the antifoaming agent results, adversely affecting the foam. More defoamer is needed to achieve the correct foam void size. This can be accomplished by adding a PCE containing an antifoaming agent or a separate antifoaming agent. At the 76 WSR tested (456 g water) in this case, EPPR 395 and PCE dispersants both containing large amounts of antifoam agents were required in order to maintain bubble size at the 100% unstable soap ratio. (FIG. 6) However, as higher dispersant levels are used to lower the WSR, the concentration of the dispersant's defoamer component in the slurry also increases which can lead to excessively large bubble sizes. The increase in the amount of defoamer can come either by increasing the total dosage of the blended dispersants or by increasing the ratio of the PCE to the EPPR at constant total dosage. A higher ratio of EPPR to PCE is necessary to avoid excessively large bubble sizes.

EXAMPLE 5

Blends Using Other Polycarboxylate Types

Additional tests using the materials, EPPR samples and test procedures of Example 4 were performed using other commercially available dispersants as the dispersant component blend. ETHACRYL® M Dispersant (CoAtex, LLC, Chester, S.C.) is a comb-branched polycarboxylate dispersant. MIGHTY 21 EG Dispersant is a polycarboxylate copolymer of methacrylic acid and is available from Kao Specialties Americas, LLC, (High Point, N.C.). Compositions of the test slurries are shown in Table 5 and properties of the slurry and set materials are in Table 6.

Use of these additives also allows for better control of the core void structure. In the samples that follow, a slump size of 18 cm, stiffening time of 2 minutes 15 seconds and void Structure B were target properties. The use of the additive combinations made it easier to address the problems of efficacy, retardation and core structure simultaneously.

TABLE 5

Test Slurry Compositions

| | | | Additive Formulation Blend | | | | |
|---|---|---|---|---|---|---|---|
| Run | Water (g) | CSA (g) | EPPR Amount, g | PCE Type | PCE Amount, g | Ratio, EPPR:PCE | Dosage (%) |
| 76 | 360 | 0.95 | 0 | Ethacryl M | 6.00 | 0:100 | 0.200 |
| 93 | 360 | 0.80 | 3.83 | Ethacryl M | 1.27 | 75:25 | 0.170 |
| 79 | 360 | 0.95 | 2.40 | Ethacryl M | 2.40 | 50:50 | 0.160 |
| 78 | 360 | 1.00 | 1.28 | Ethacryl M | 3.82 | 25:75 | 0.170 |
| 82 | 324 | 2.10 | 0 | Ethacryl M | 11.10 | 0:100 | 0.370 |
| 97 | 324 | 0.70 | 4.95 | Ethacryl M | 1.65 | 75:25 | 0.220 |
| 95 | 324 | 0.75 | 3.15 | Ethacryl M | 3.15 | 50:50 | 0.210 |
| 87 | 324 | 1.15 | 1.72 | Ethacryl M | 5.18 | 25:75 | 0.230 |
| 111 | 360 | 0.85 | 0 | Mighty 21G | 0 | 0:100 | 0.270 |
| 115 | 360 | 0.80 | 2.25 | Mighty 21G | 2.55 | 50:50 | 0.170 |

TABLE 6

Foam Addition and Test Results

| Run | Slump (cm) | Stiffening Time | Cup Wt. (g) | Soap (25AS:PFM33) | Foam Time(s) | Void Structure |
|---|---|---|---|---|---|---|
| 76 | 17.9 | 2:20 | 205.64 | 0.5% (100:0) | 14 | A |
| 93 | 18.1 | 2:15 | 202.83 | 0.5% (75:25) | 13 | B |
| 79 | 17.9 | 2:10 | 203.91 | 0.5% (100:0) | 14 | B |
| 78 | 18.6 | 2:10 | 203.78 | 0.5% (100:0) | 14 | A |
| 82 | 18.0 | 2:20 | 200.88 | 0.5% (100:0) | 15 | A |
| 97 | 18.1 | 2:10 | 199.80 | 0.5% (50:50) | 15 | B |
| 95 | 17.8 | 2:10 | 194.32 | 0.5% (75:25) | 15 | B |
| 87 | 18.1 | 2:10 | 193.86 | 0.5% (100:0) | 18 | B |
| 111 | 17.8 | 2:20 | 197.28 | 0.5% (100:0) | 13 | A |
| 115 | 18.0 | 2:20 | 202.63 | 0.5% (80:20) | 14 | B |

Surprisingly, combination of the polycondensation component with the Ethacryl M and Mighty 21G brand dispersant components gave different results than when used with Melflux brand dispersants. The combinations of Example 4 demonstrated a change in efficacy but little change in bubble size in the set samples. However, in this example with different polycarboxylate dispersants, efficacy varied less but increased control over void structure was observed.

EXAMPLE 6

A polycondensate product component (EPPR) was prepared according to Example 3 and surfactant S2, also from Example 3, was used as the dispersant component. The set retarder was Versenex 80, which is a pentasodium diethylenetriaminepentaacetate set retarder (Dow Chemical, Midland, Mich.) and is used as a 20% solution. Other materials and test conditions of Example 4 were repeated with various combinations of these additives as noted in Table 7 below:

TABLE 7

Test Slurry Compositions

| | | Additive Formulation Blend | | | | | |
|---|---|---|---|---|---|---|---|
| Run | Water (g) | CSA (g) | EPPR Amount, g | PCE Type | PCE Amt, g | Ratio, EPPR:PCE | Dosage (%) | Retarder, g |
| 119 | 360 | 1.90 | 2.40 | 652 | 2.40 | 50:50 | 0.160 | 0 |
| 122 | 360 | 1.90 | 2.40 | 652 | 2.40 | 50:50 | 0.160 | 0.25 |
| 125 | 360 | 0.90 | 5.70 | None | 0 | 100:0 | 0.190 | 0 |
| 127 | 360 | 0.90 | 5.70 | None | 0 | 100:0 | 0.190 | 0.25 |

TABLE 8

Foam Addition and Test Results

| Run | Slump (cm) | Stiffening Time | Cup Wt. (g) | Soap (25AS:PFM33) | Foam Time(s) |
|---|---|---|---|---|---|
| 119 | 18.0 | 2:15 | 200.9 | 0.5% (50:50) | 14 |
| 122 | 19.1 | 2:15 | 206.36 | 0.5% (50:50) | 13 |
| 125 | 17.9 | 2:15 | 203.56 | 0.5% (60:40) | 14 |
| 127 | 18.8 | 2:15 | 205.38 | 0.5% (60:40) | 14 |

Slump increased from 17.9 cm to 18.8 cm while maintaining the same stiffening time by varying the amount of CSA set accelerator. These results indicate that the addition of a small amount of retarder in combination with the dispersant component and polycondensation component led to enhanced efficacy. This can be translated into additional water reduction or lower dispersant usage.

EXAMPLE 7

The effect of modifiers with the combined dispersant component and polycondensation component was tested in a gypsum slurry. The gypsum slurry included stucco, 60 grams of water per 100 grams of stucco. Dispersants and polycondensation components were added until a patty size of 17.8 cm+/−0.3 cm was obtained in a slump test. EPPR 568 was used as the polycondensation component, while PCE 652 was the dispersant component. Two sets of data were obtained, one using the polycondensation component alone and the other using a 1:1 ratio by weight of the polycondensation component to dispersant component ("EPPR+PCE"). In each set of data, a control sample with no modifier was tested, together with samples with modifiers shown in Table 9 below.

TABLE 9

| Sample | Dispersant | Dose | Modifier |
|---|---|---|---|
| 1 | EPPR | 0.22% | None |
| 2 | EPPR | 0.22% | Lime |
| 3 | EPPR | 0.20% | Soda Ash |
| 4 | EPPR + PCE | 0.17% | None |
| 5 | EPPR + PCE | 0.14% | Lime |
| 6 | EPPR + PCE | 0.13% | Soda Ash |

Looking to the dispersant component and polycondensate component combination, an increase in efficacy was observed with both soda ash and with lime. Use of the EPPR dispersant alone resulted in a reduction of dosage with soda ash only. Although both dispersants demonstrated the modifying effect with soda ash, the EPPR:PCE blend showed a greater degree of improvement compared to the EPPR alone. The blend also allowed reduction in the dispersant dosage in the presence of lime.

EXAMPLE 8

The samples of Example 7 were tested to determine the hydration effects of the modifiers. The amount of dispersant component and polycondensate component used was the same as in Table 9, while the amount of CSA set accelerator was changed as necessary to obtain information as to the set retardation of the mixtures. The amount of CSA set accelerator was varied according to Table 10 to produce a slurry with a stiffening point of 2:10+/−0:05.

TABLE 10

| Sample | Dispersant | Modifier | Dose | Amt. CSA |
|---|---|---|---|---|
| 1 | EPPR | None | 0 | 1.1 g |
| 2 | EPPR | Lime | 0.15% | 0.9 g |
| 3 | EPPR | Soda Ash | 0.04% | 4.5 g |
| 4 | EPPR + PCE | None | 0 | 2.8 g |
| 5 | EPPR + PCE | Lime | 0.15% | 2.7 g |
| 6 | EPPR + PCE | Soda Ash | 0.04% | 6.5 g |

It is clear from the data above that soda ash can retard the hydration reaction of calcined gypsum significantly, while lime has a slight accelerating effect in this example. The 1:1 blend of EPPR and PCE demonstrated a more pronounced retardation in the control sample as well as when modifiers were added compared to using EPPR alone.

EXAMPLE 9

Comparative Example of Method

Attempts were made to prepare a gypsum slurry having a slump size of 17.8 cm+/−0.3 cm, a stiffening time of 2:10+/−0:05 and a mixed core bubble size distribution. This example demonstrates the steps that must be taken when the present method is not utilized.

Step A: A slurry was prepared according to Example 4 that included 600 g of synthetic gypsum, a WSR of 60 and 1.8 g CSA accelerator. A blend of 25% EPPR 568 and 75% PCE 652 was added to the slurry at a dosage of 0.13% of total dispersants solids by weight of the dry calcined gypsum. Foam was generated using a 1:1 blend of 25AS and PFM33 at a dosage of 0.5% based on total soap solution. Testing of the slurry revealed that the slump was 18.7 cm, the stiffening time was 2:40 and the bubbles were too large.

Step B: In order to reduce the bubble size distribution in the product of Step A, the amount of stable soap was increased from 50% of the soap blend to 100% of the soap. All other components and preparation steps remained the same. This second product had a smaller slump at 18.3 cm and smaller bubbles. The stiffening time remained the long at 2:40.

Step C: To reduce the stiffening time in the product of Step B, the amount of CSA set accelerator was increased from 1.8 g to 2.1 g. The stiffening time was reduced to 2:30, but was still too long. The bubble size was slightly smaller, bring it into the desired range, but the stiffening was still too long.

Step D: The amount of CSA set accelerator was increased in the Product of Step C from 2.1 g to 2.8 g to bring the stiffening into range. Bubble size and stiffening time were within range, but the resulting slump size was now too small.

Step E: To increase the slump size, the amount of dispersant in the product of Step D was increased from 0.13% to 0.14% based on the weight of dry calcined gypsum to improve the flowability of the slurry. This resulted in bringing the bubble size, the stiffening time and the slump into the appropriate range. These steps can be performed in any order to obtain the final desired parameters.

EXAMPLE 10

Instead of changing the soap composition, the amount of set accelerator and the dosage of dispersant, the product of Step A was changed by changing the ratio of EPPR to PCE from 25:75 to 40:60. This single change resulted in a stiffening time of 2:20, a slump size of 17.5 cm and a good bubble size distribution. Adapting the ratio of the polycondensation component to the dispersant component not only resulted in a more direct method of obtaining the desired properties, but it resulted in smaller amounts of additives being utilized, saving time, money and raw materials. This provides for another tool to be utilized when changes in other methods are insufficient.

While particular embodiments of the gypsum panels have been shown and described, it will be appreciated by those skilled in the art that changes and modifications may be made thereto. Unless otherwise noted, features of specific embodiments may be combined with any other features described. Unless otherwise noted, all ratios or percentages expressed herein are intended to be based on weight. The term "or" is intended to be inclusive of combinations of elements in a given list. These and other modifications may be made without departing from the invention in its broader aspects and as set forth in the following claims.

What is claimed is:

1. A gypsum slurry comprising:
   calcium sulfate hemihydrate;
   water;
   a dispersant component selected from the group consisting of a comb-branched polymer having polyether side chains, naphthalene sulfonate-formaldehyde condensate, melamine sulfonate-formaldehyde condensate and mixtures of two or more thereof;
   a foaming agent; and
   a polycondensation component comprising:
   a first polycondensation repeating unit having a polyether side chain and one of the group consisting of an aromatic sub-unit and a heteroaromatic sub-unit;
   a second polycondensation repeating unit having a OP(OH)$_2$ group and one of the group consisting of an aromatic sub-unit and a heteroaromatic sub-unit; and
   a third polycondensation repeating unit having one of the group consisting of an aromatic sub-unit and a heteroaromatic sub-unit;
   wherein said second polycondensation repeating unit and said third polycondensation repeating unit differ exclusively in that the OP(OH)$_2$ groups of said second polycondensation repeating unit are replaced by H in said third polycondensation repeating unit, and said third polycondensation repeating unit is not the same as said first polycondensation repeating unit; and
   wherein the weight ratio of the dispersant component to the polycondensation component ranges from 1:99 to 75:25.

2. The gypsum slurry of claim 1 wherein one of the group consisting of said dispersant component, said polycondensation component or both further comprises an antifoaming component.

3. The gypsum slurry of claim 1 wherein said dispersant component is said comb-branched copolymer having polyether side chains and comprises:
   at least one first polycarboxylate repeating unit derived from an olefinically unsaturated monocarboxylic acid comonomer or an ester or a salt thereof and an olefinically unsaturated sulfonic acid comonomer or a salt thereof; and
   at least one second polycarboxylate repeating unit of the general formula

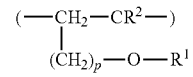

wherein R$^1$ is

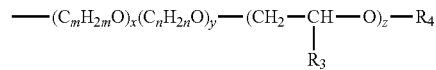

and R$^2$ is H or an aliphatic hydrocarbon radical having 1 to 5 C atoms; R$^3$ is an unsubstituted or substituted aryl radical and R$^4$ is H, an aliphatic hydrocarbon radical having 1 to 20 C atoms, a cycloaliphatic hydrocarbon radical having 5 to 8 C atoms, a substituted aryl radical having 6 to 14 C atoms, or one of the group consisting of:

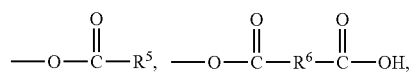

-continued

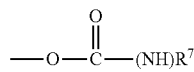

wherein $R^5$ and $R^7$ each represent an alkyl, aryl, aralkyl or alkaryl radical;

$R^6$ represents an alkylidene, arylidene, aralkylidene or alkarylidene radical;

p=0, 1, 2, 3 or 4; m and n each, independently of one another, is 2, 3, 4 or 5;

x and y each, independently of one another, is an integer≤350; and z is from 0 to about 200; and wherein either the first and second polycarboxylate repeating units have no internal molecular differences or said first and second polycarboxylate repeating units have internal molecular differences with respect to at least one of said radicals $R^1$; $R^2$; $R^3$; $R^4$; $R^5$; $R^6$; $R^7$; m; n; x; y; and z, and the differences relate to the composition and length of side chains.

4. The gypsum slurry of claim 3, wherein said first polycarboxylate repeating unit is present in amounts of 30 to 99 mol % and said second polycarboxylate repeating unit is present in amounts of about 70 to about 1 mol % of the dispersant component.

5. The gypsum slurry of claim 1, wherein said first polycondensation repeating unit of the polycondensation component is represented by Formula VII:

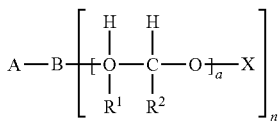

wherein A has 5 to 10 C atoms and is a substituted or unsubstituted aromatic or heteroaromatic compound; B is N, NH or O; n is 2 if B is N and n is 1 if B is NH or O; $R^1$ and $R^2$ each, independently of one another, is a branched or straight-chain $C_1$- to $C_{10}$-alkyl radical, $C_5$- to $C_8$-cycloalkyl radical, aryl radical, heteroaryl radical or H; a is an integer from about 1 to about 300, X is a branched or straight-chain $C_1$- to $C_{10}$-alkyl radical, $C_5$- to $C_8$-cycloalkyl radical, aryl radical, heteroaryl radical or H;

wherein said second polycondensate repeating unit of said polycondensation component is represented by Formula (VIII):

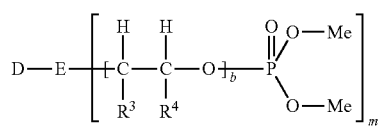

wherein said third polycondensate repeating unit of said polycondensation component is represented by Formula (IX):

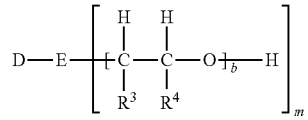

wherein in Formula (VIII) and Formula (IX) D is a substituted or unsubstituted heteroaromatic compound having 5 to 10 C atoms; E is N, NH or O; m is 2 if E is N and m is 1 if E is NH or O; $R^3$ and $R^4$ each, independently of one another, is a branched or straight-chain $C_1$- to $C_{10}$-alkyl radical, $C_5$- to $C_8$-cycloalkyl radical, aryl radical, heteroaryl radical or H; b is an integer from 0 to 300; M is an alkaline metal ion, alkaline earth metal ion, ammonium ion, organic ammonium ion and/or H, and c is ½ if M is an alkaline earth metal ion, or else c is 1; and wherein A, B, $R^1$, $R^2$, a, X, D, E, $R^3$, $R^4$, b, and M are each, independently of one another, identical or different among said individual first polycondensate repeating units.

6. The gypsum slurry of claim 1 further comprising an additive selected from the group consisting of a set accelerator, a set retarder, an anti-sagging agent, a bonding agent, a dedusting agent, a reinforcing material, a biocide and combinations thereof.

7. The gypsum slurry of claim 1 wherein said foaming agent is a mixture of a first foaming agent which forms stable foam and a second foaming agent which forms unstable foam.

8. A method of making the gypsum slurry of claim 1 comprising:
    combining and mixing calcium sulfate hemihydrate, water, the foaming agent, the dispersant component and the polycondensation component to form the gypsum slurry with foam bubbles, wherein the ratio of the dispersant component to the polycondensation component is adjusted to control the size of the foam bubbles.

9. The method of claim 8 wherein the foaming agent is in the form of foam.

10. The method of claim 8 further comprising adding an additive selected from the group consisting of a set accelerator, a set retarder, an anti-sagging agent, a bonding agent, a dedusting agent, a reinforcing material, a biocide and combinations thereof.

11. A gypsum slurry comprising:
    calcium sulfate hemihydrate;
    water;
    a foaming agent;
    a comb-branched polymer having polyether side chains; and
    a polycondensation component comprising:
    a first polycondensation repeating unit having a polyether side chain and one of the group consisting of an aromatic sub-unit and a heteroaromatic sub-unit;
    a second polycondensation repeating unit having a OP(OH)$_2$ group and one of the group consisting of an aromatic sub-unit and a heteroaromatic sub-unit; and
    a third polycondensation repeating unit having one of the group consisting of an aromatic sub-unit and a heteroaromatic sub-unit;
    wherein said second polycondensation repeating unit and said third polycondensation repeating unit differ exclusively in that the OP(OH)$_2$ groups of said second polycondensation repeating unit are replaced by H in said third polycondensation repeating unit, and said third polycondensation repeating unit is not the same as said first polycondensation repeating unit; and wherein the weight ratio of the comb-branched polymer having polyether side chains to the polycondensation component ranges from 1:99 to 75:25.

12. The gypsum slurry of claim 1, wherein said dispersant component is naphthalene sulfonate-formaldehyde condensate, melamine sulfonate-formaldehyde condensate or mixtures thereof.

13. A gypsum product prepared from the gypsum slurry of claim 1 by allowing calcium sulfate hemihydrate to hydrate and form a calcium sulfate dehydrate matrix.

14. A method of making a gypsum product, the method comprising preparing a gypsum slurry according to the method of claim 8, forming the gypsum product without depositing the gypsum slurry onto a conveyor and allowing calcium sulfate hemihydrate to hydrate and form a calcium sulfate dihydrate matrix.

* * * * *